(12) United States Patent
Hiramoto et al.

(10) Patent No.: US 10,609,188 B2
(45) Date of Patent: Mar. 31, 2020

(54) INFORMATION PROCESSING APPARATUS, INFORMATION PROCESSING SYSTEM AND METHOD OF CONTROLLING INFORMATION PROCESSING SYSTEM

(71) Applicant: FUJITSU LIMITED, Kawasaki-shi, Kanagawa (JP)

(72) Inventors: Shinya Hiramoto, Yokohama (JP); Yuji Kondo, Kawasaki (JP); Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/944,278

(22) Filed: Apr. 3, 2018

(65) Prior Publication Data

US 2018/0309859 A1  Oct. 25, 2018

(30) Foreign Application Priority Data

Apr. 21, 2017  (JP) ................. 2017-084451

(51) Int. Cl.
*H04L 29/08* (2006.01)
*H04L 12/861* (2013.01)
*H04L 12/805* (2013.01)
*H04L 12/741* (2013.01)
*H04L 29/06* (2006.01)

(52) U.S. Cl.
CPC ............ *H04L 69/324* (2013.01); *H04L 45/74* (2013.01); *H04L 47/36* (2013.01); *H04L 49/9057* (2013.01); *H04L 69/22* (2013.01)

(58) Field of Classification Search
CPC ....... H04L 69/324; H04L 69/22; H04L 45/74; H04L 47/36; H04L 49/9057

USPC ......................................................... 370/474
See application file for complete search history.

(56) References Cited

U.S. PATENT DOCUMENTS 6,493,343 B1    12/2002  Garcia et al.
2001/0018732 A1*  8/2001  Nakagoshi ............. G06F 15/17
                                                        712/11

FOREIGN PATENT DOCUMENTS

EP           0884880       12/1998
JP           10-341247     12/1998
JP           2001-202345    7/2001

* cited by examiner

*Primary Examiner* — Yemane Mesfin
*Assistant Examiner* — Intekhaab A Siddiquee
(74) *Attorney, Agent, or Firm* — Fujitsu Patent Center

(57) ABSTRACT

An information processing apparatus includes a receiver to receive data-packets, the data-packets generated by dividing a message into division-data and storing, for each of the division-data, one of the plurality of division data into one of the plurality of data packets, wherein each of the data-packets also includes a data value indicating a quantity of the division-data and data indicating whether or not the data-packet includes final division data corresponding to an end of the message, a memory, and a processor to store the division-data that is contained in a packet of the data-packets that are received, in the memory, and suppress the final division-data from being stored in the memory until the quantity of the data-packets received by the receiver equates to the data value indicating the quantity of the division-data, in a case where the final division-data is received earlier than any one of the other division-data.

8 Claims, 17 Drawing Sheets

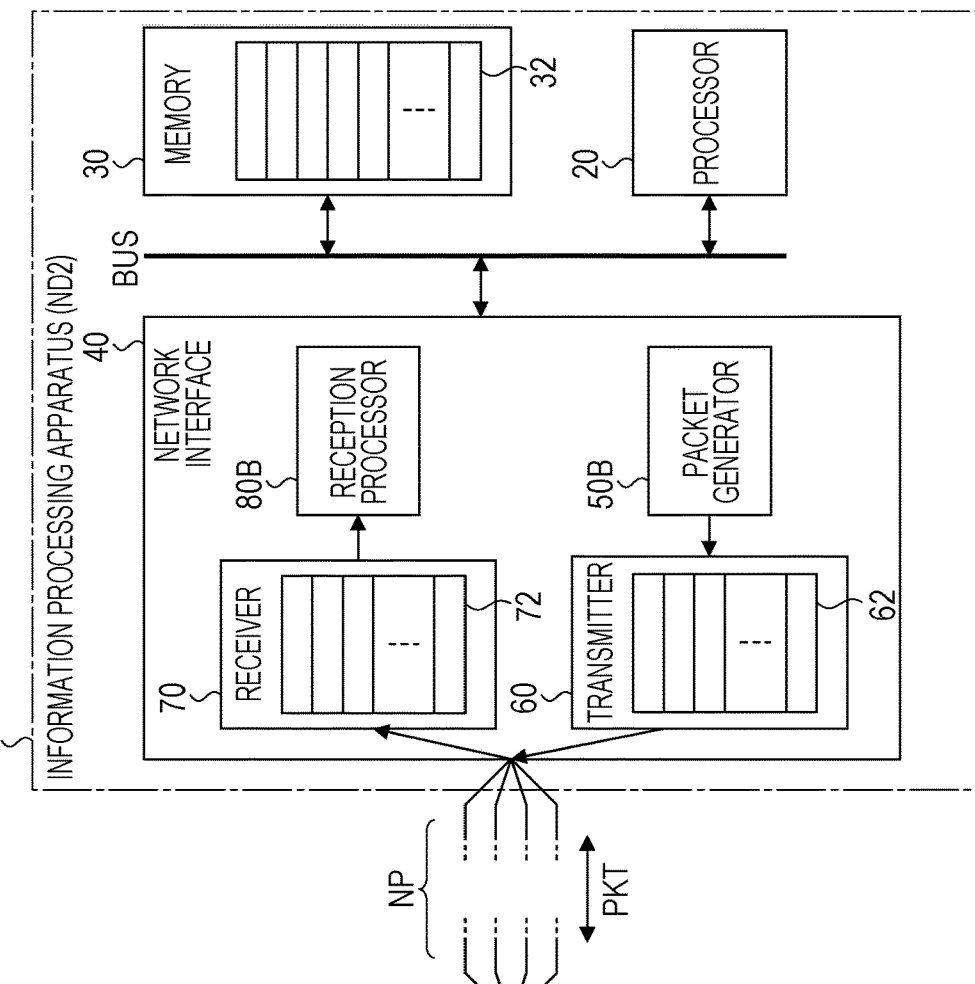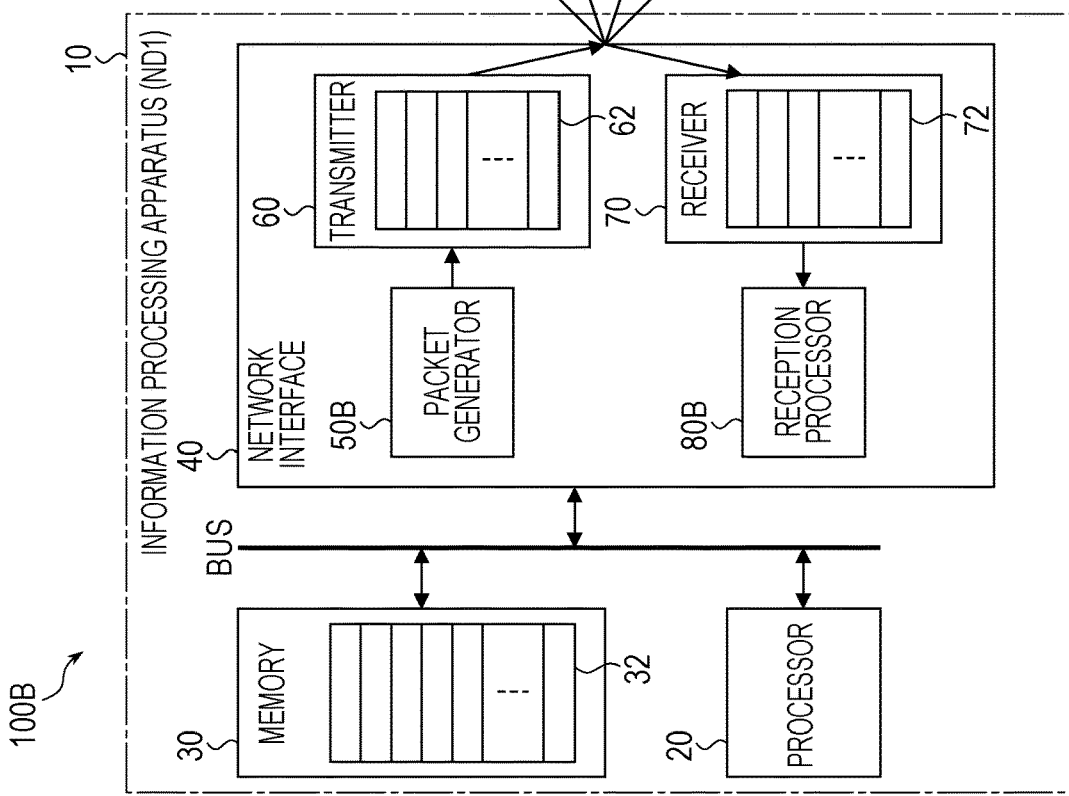
FIG. 11

INFORMATION PROCESSING APPARATUS, INFORMATION PROCESSING SYSTEM AND METHOD OF CONTROLLING INFORMATION PROCESSING SYSTEM

CROSS-REFERENCE TO RELATED APPLICATION

This application is based upon and claims the benefit of priority of the prior Japanese Patent Application No. 2017-084451, filed on Apr. 21, 2017, the entire contents of which are incorporated herein by reference.

FIELD

The embodiments discussed herein are related to an information processing apparatus, an information processing system, and a method of controlling the information processing system.

BACKGROUND

In a case where in communication that uses a packet, a size of data that is transmitted exceeds a size suitable for containing the data in one packet, the data is divided into a plurality of pieces of data and the plurality of pieces of data are transmitted in state of being contained in a plurality of packets, respectively. Each of the plurality of packets that contain the plurality of pieces of data, respectively, that result from the division, contains a value common to every data, information indicating the order of packets, and information indicating whether or not a packet is a final packet (for example, Japanese Laid-open Patent Publication No. 10-341247).

Furthermore, in a case where data is divided into a plurality of pieces of data and the plurality of pieces of data are transmitted in a state of being contained in a plurality of packets, respectively, a transmission node that transmits a packet adds acknowledgement information for acknowledging normal reception in a reception node that receives the packet, to each packet, and transmits the packet containing the acknowledgement information. The reception node acknowledges whether or not the packet is normally received, based on the acknowledgment information (for example, Japanese Laid-open Patent Publication No. 2001-202345).

On the other hand, in a case where the packet is transferred via a plurality of paths, a flag that identifies a transfer that uses an in-order scheme which guarantees the order in which the packets arrive and transfer that uses an out-order scheme which does not guarantee the order in which the packets arrive, is added to the packet, and thus, communication that uses the in-order scheme and the out-of-order scheme is possibly performed. For example, in the communication that uses the in-order scheme, the packet is transmitted with a sequence number being sequentially incremented, and in the communication that uses the out-of-order scheme, the packet is transmitted with the sequence number being fixed (for example, U.S. Pat. No. 6,493,343).

SUMMARY

According to an aspect of the invention, an information processing apparatus includes a receiver configured to receive a plurality of data packets, the plurality of data packets generated by dividing a message into a plurality of division data and storing, for each of the plurality of division data, one of the plurality of division data into one of the plurality of data packets, wherein each of the plurality of data packets also includes a data value indicating a quantity of the plurality of division data and data indicating whether or not the data packet includes final division data corresponding to an end of the message, a memory, and a processor coupled to the memory, the processor configured to store the division data that is contained in a packet of the plurality of data packets that are received by the receiver, in the memory, and suppress the final division data from being stored in the memory until the quantity of the plurality of data packets received by the receiver equates to the data value indicating the quantity of the plurality of division data, in a case where the final division data is received earlier than any one of the other plurality of division data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an information processing apparatus, an information processing system, and a method of controlling the information processing system, according to another embodiment;

DESCRIPTION OF EMBODIMENTS

In a case where data is divided into a plurality of pieces of division data and where packets that contain pieces of division data, respectively, which result from the division, are transmitted toward a reception node via a plurality of paths, the order in which the packets arrive at the reception node is not guaranteed. For this reason, in some cases, the reception node receives a packet including finally-transmitted division data and then receives a packet including one other piece of division data. In a case where, based on the reception of the finally-transmitted division data, the reception node determines reception of all pieces of division data and starts data processing or the like using the division data, when division data that is not received is present, it is difficult to perform the data processing normally.

An embodiment of a technology in which, in a case where a plurality of packets that contain pieces of division data, respectively, that result from dividing transfer-target data are transferred via a plurality of paths, respectively, it is guaranteed that all pieces of division data are received regardless of the order in which the finally-transmitted division data is received.

Figure 1:
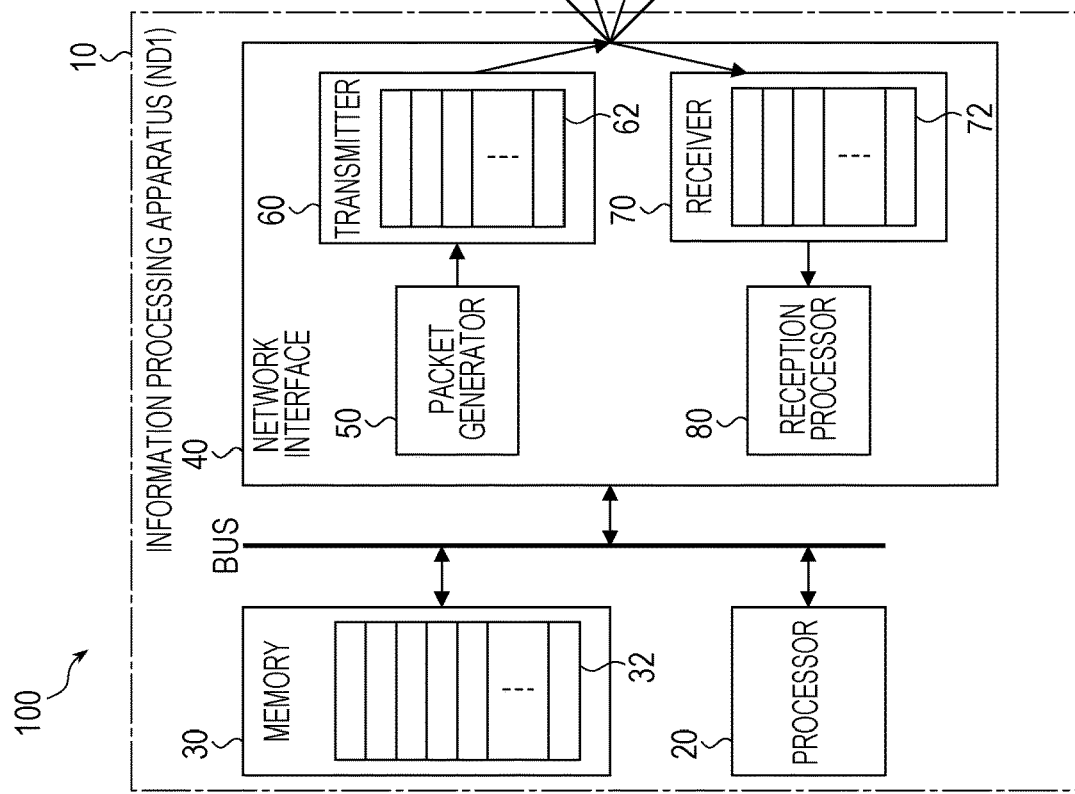
FIG. 1 is a diagram illustrating an information processing apparatus, an information processing system, and a method of controlling the information processing system, according to an embodiment.

FIG. 1 illustrates a method of controlling an information processing apparatus, an information processing system, and a method of controlling the information processing system, according to an embodiment. An information processing system 100 that is illustrated in FIG. 1 has a plurality of information processing apparatuses 10 that are connected to each other via a plurality of paths NP. Each information processing apparatus 10 has a processor 20, such as a central processing unit (CPU), a memory 30, and a network interface 40. The processor 20, the memory 30, and the network interface 40 are connected to each other via a bus BUS.

The processor 20, for example, operates by executing a program that is retained in the memory 30, and performs computing processing or the like using data that is retained in the memory 30. Data, a program, and the like are stored in the memory 30. It is noted that instead of the processor 20, a processor core may be installed.

The network interface 40 transfers a packet PKT between the information processing apparatus to which the network interface 40 itself belongs and each of the other information processing apparatuses 10 that are connected via the plurality of paths NP. In the following description, the information processing apparatus 10 is also referred to as a node ND (ND1 or ND2). The processor 20 is an example of a computing processing device that performs the computing processing. The memory 30 is an example of a memory in which data is stored. The network interface 40 is an example of a communication device.

The network interface 40 has a packet generator 50, a transmitter 60, a receiver 70, and a reception processor 80. The reception processor 80 is an example of a processor, and may realize a given function using a processor that includes a hardware processor. The packet generator 50 generates the packet PKT, and outputs the generated packet PKT to the transmitter 60. In a case where a size of the transfer-target data that is a transfer target exceeds a size suitable for containing the transfer-target data in the packet PKT, the packet generator 50 generates the packets PKT that contain the plurality of pieces of division data, respectively, which result from dividing the transfer target data, and outputs the generated packets PKT to the transmitter 60.

Figure 4:
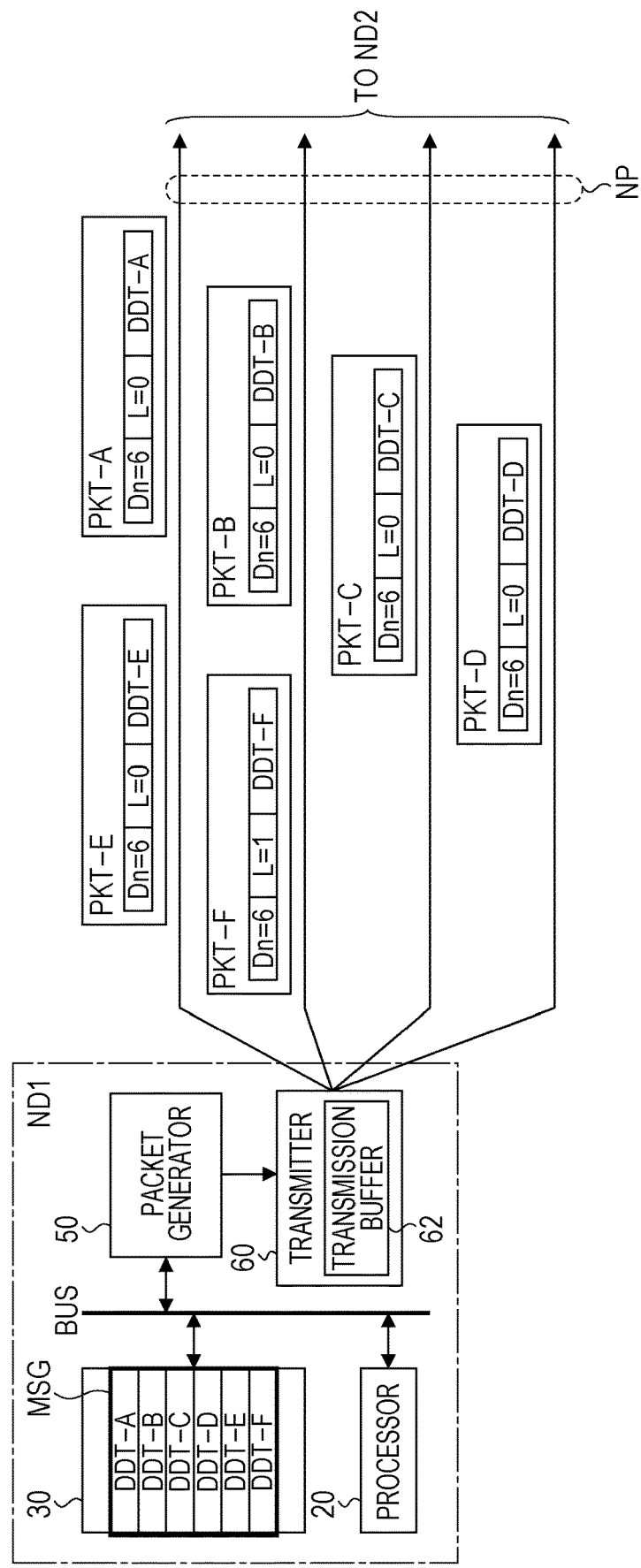
FIG. 4 is a diagram illustrating an example of an operation of transmitting the packet in the information processing system which is illustrated in FIG. 1.

The transmitter 60 has a plurality of transmission buffers 62 that retain a plurality of packets PKT, respectively, that are output from the packet generator 50, and transmits the packet PKT that is retained in the transmission buffer 62 to the node ND that is a transmission destination of the packet PKT. The detail of operation of each of the packet generator 50 and the transmitter 60 is illustrated in FIG. 4.

The receiver 70 has a plurality of reception buffers 72, receives the packet PKT that is transmitted by one other node ND, and stores the division data and various pieces of information, which are contained in the received packet PKT, in the reception buffer 72. The reception processor 80 stores the division data that is retained in the reception buffer 72, in the memory 30. The detail of operation of each of the receiver 70 and the reception processor 80 is illustrated in FIGS. 5 to 8.

It is noted that, in a case where a destination of the received packet PKT is not the node ND to which the network interface 40 itself belongs, the network interface 40 functions as a relay node that transfers the packet PKT toward the node ND which is the destination of the packet PKT. Processing that relays the packet PKT is performed by a network unit that is not illustrated.

Figure 2:
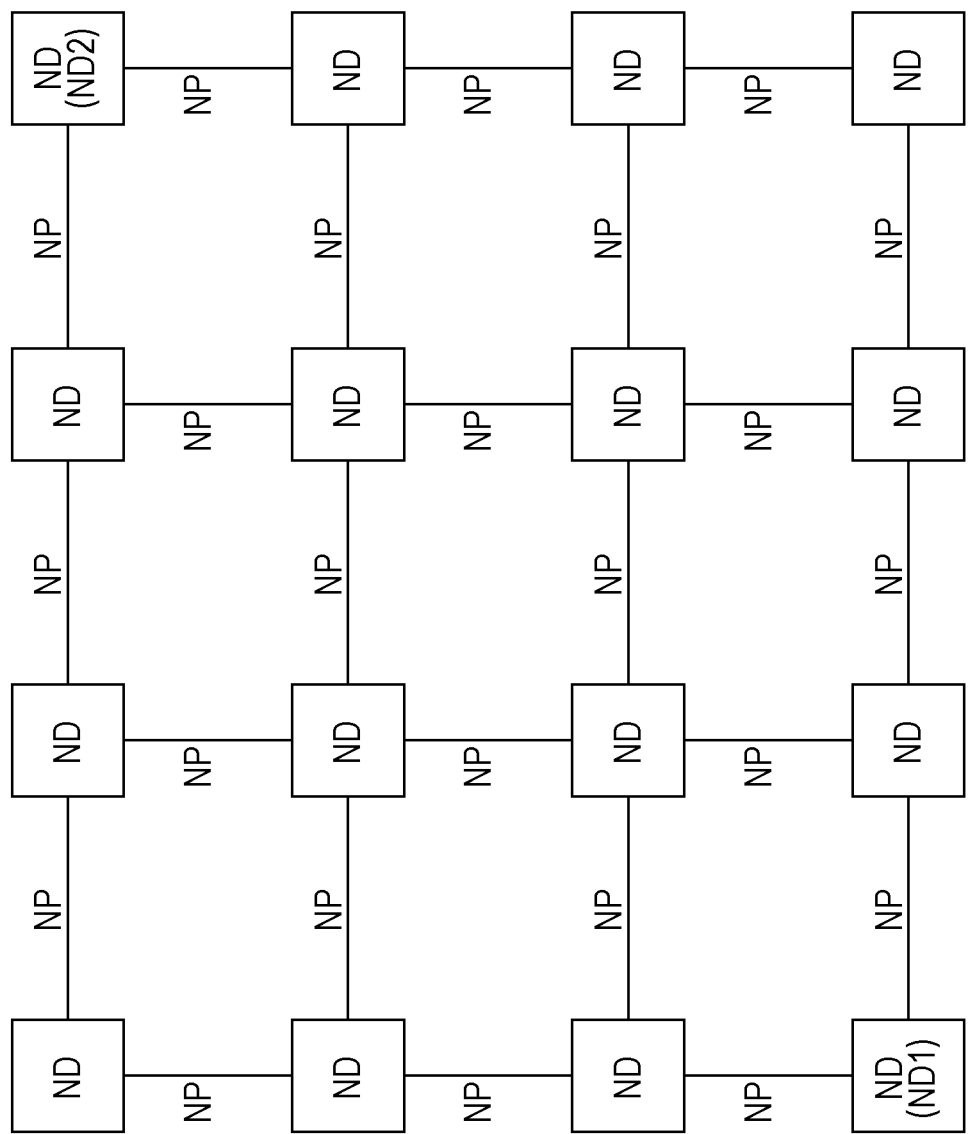
FIG. 2 is a diagram illustrating an example of a configuration of a network in the information processing system that is illustrated in FIG. 1.

FIG. 2 illustrates an example of a configuration of a network in the information processing system 100 that is illustrated in FIG. 1. The information processing system 100 that is illustrated in FIG. 1 has a plurality of nodes ND that are connected to each other by a mesh-type two-dimensional network, and, for example, operates as a parallel computer. It is noted that the number of dimensions of the network, a topology (a mesh topology, a torus topology, or the like) of the network, and the number of nodes ND that are connected to the network are limited to those in FIG. 2. For example, the nodes ND1 and ND2 that are illustrated in FIG. 1 are a node ND in the lower left portion of FIG. 2 and a node ND in the upper right portion of FIG. 2, respectively, and the nodes ND1 and ND2 are connected to each other via paths that are the plurality of paths NP.

Figure 3:
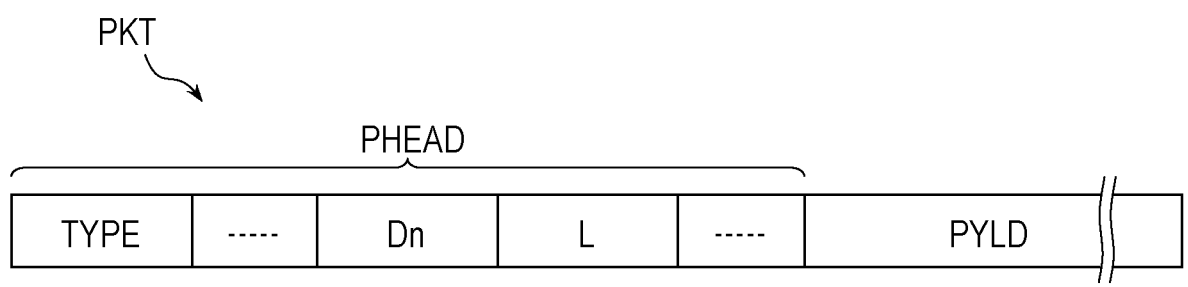
FIG. 3 is a diagram illustrating an example of a format of a packet that is used in the information processing system which is illustrated in FIG. 1.

FIG. 3 illustrates an example of a format of the packet PKT that is used in the information processing system 100 which is illustrated in FIG. 1. The packet PKT includes a packet header PHEAD and a payload PYLD in which data is contained. The packet header PHEAD includes an area in which a packet type, number-of-pieces-of-division-data information Dn, and final data information L are contained.

For example, information that identifies a type of packet, such as a request packet or a response packet, is contained in the packet type TYPE. Contained in the number-of-pieces-of-division-data information Dn is the number of pieces of division data in a case where the transfer-target data is divided into a plurality of pieces of division data and the plurality of pieces of division data are transferred. In a case where final division data that is the finally-transmitted division data is contained, an area for the final data information L is set to "1". In a case where division data other the final division data is contained, the area for the final data information L is set to "0". In a case where the transfer-target data is transferred without being divided, the number-of-pieces-of-division-data information Dn is set to "1", and the final data information L is set to "1". It is noted that the final division data is division data that is positioned in the rearmost portion of the transfer-target data, of the plurality of pieces of division data that result from dividing the transfer-target data.

It is noted that, in addition to what are illustrated in FIG. 3, the packet header PHEAD has an area in which transmission source information that identifies a transmission source of the packet PKT is contained, and an area in which transmission destination information that identifies the transmission destination of the packet PKT is contained. Furthermore, in a case where the packet PKT contains data, the packet header PHEAD has an area in which a size of data is contained, and an area in which an address of a transfer destination of the data. The address of the transfer destination of the data is an address (a head address) of a memory area 32 of the memory 30 of the node ND that is a transfer destination of the packet PKT, at which data is stored.

FIG. 4 illustrates an example of an operation of transmitting the packet PKT in the information processing system 100 which is illustrated in FIG. 1. The transfer-target data is also referred to as a message MSG. In an example that is illustrated in FIG. 4, the message MSG is divided into six pieces of division data DDT (DDT-A, DDT-B, DDT-C, DDT-D, DDT-E, and DDT-F), and the six pieces of division data DDT are transferred from the node ND1 to the node ND2. The node ND1 is an example of a first information processing apparatus that is a packet transmission source, and the node ND2 is an example of a second information processing apparatus that is a packet transmission destination.

First, the packet generator 50 of the node ND1 sequentially reads the division data DDT that is retained in the memory 30. The packet generator 50 sequentially generates the packet PKT (PKT-A, PKT-B, PKT-C, PKT-D, PKT-E, and PKT-F) that includes the division data DDT that is read, the number-of-pieces-of-division-data information Dn, and the final data information L.

Because the message MSG is divided into six portions and the six portions are transferred, the number-of-pieces-of-division-data information Dn of each packet PKT is set to "6". Furthermore, the final data information L of the packet PKT-F that contains the final division data DDT-F is set to "1", and the final data information L of the packet PKT that contains the division data DDT other than the final division data DDT-F is set to "0". Then, the packet generator 50 sequentially stores the generated packet PKT in the transmission buffer 62 of the transmitter 60.

The transmitter 60 sequentially transmits the packet PKT that is stored in the transmission buffer 62, toward the node ND2 via the plurality of paths NP. The processor 20 determines via which one of the plurality of paths NP each of the plurality of packets PKT is transmitted. It is noted that a path for transferring the packet PKT over a network that is illustrated in FIG. 2 may be determined by the network interface 40 of the node ND that relays the packet PKT, based on congestion in the network or a malfunctioning portion of the network.

Figure 5:
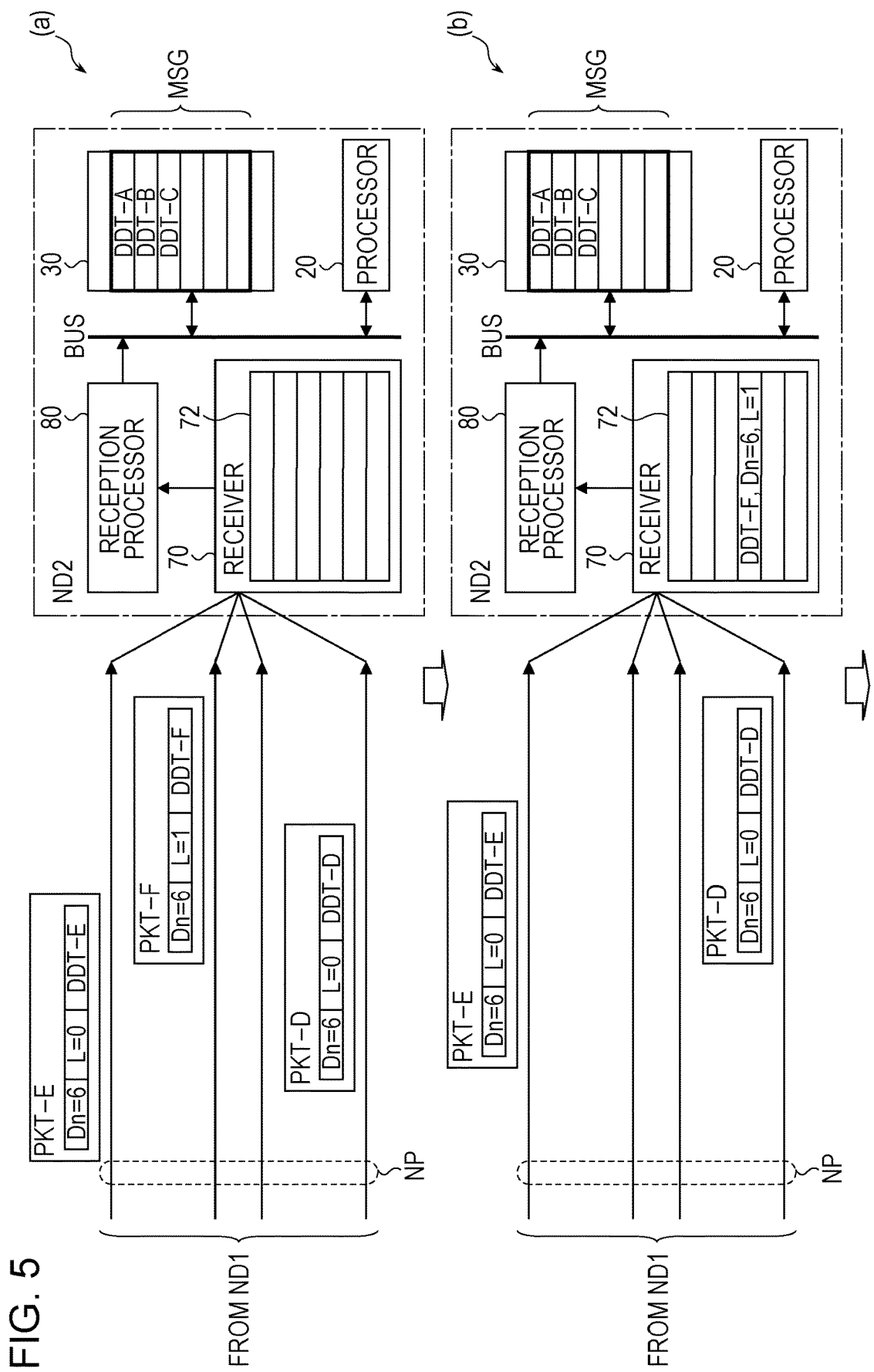
FIG. 5 is a diagram illustrating an example of an operation of receiving the packet in the information processing system that is illustrated in FIG. 1.
Figure 6:
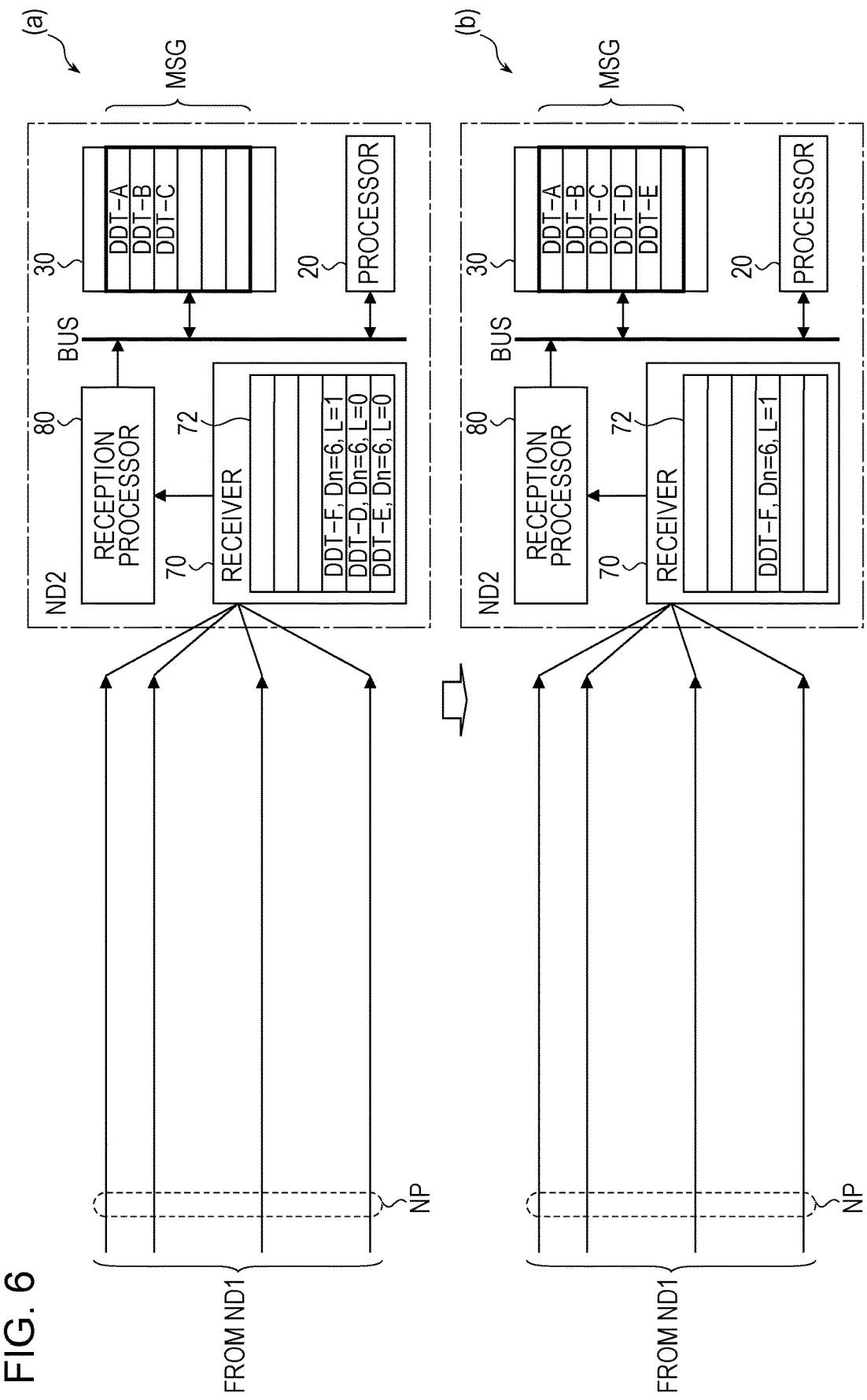
FIG. 6 is a diagram illustrating a continuation of the operation of receiving the packet that is illustrated in FIG. 5.

FIGS. 5 to 6 illustrate an example of an operation of receiving the packet PKT in the information processing system 100 that is illustrated in FIG. 1. First, the receiver 70 of the node ND2 sequentially receives the packets PKT-A, PKT-B, and PKT-C. The receiver 70 stores the pieces of division data DDT-A, DDT-B, and DDT-C, which are contained in the received packets PKT-A, PKT-B, and PKT-C, respectively, and various pieces of information, such as the number-of-pieces-of-division-data information Dn and the final data information L, which are contained in each of the received packets PKT-A, PKT-B, and PKT-C, in the reception buffer 72 (not illustrated).

The final data information L that is contained in the packets PKT-A, PKT-B, and PKT-C is "0". For this reason, the reception processor 80 sequentially stores the pieces of division data DDT-A, DDT-B, and DDT-C that are contained in the packets PKT-A, PKT-B, and PKT-C, respectively, in the memory 30 ((a) of FIG. 5) in the order of reception.

Furthermore, because the number-of-pieces-of-division-data information Dn that is contained in the packet PKT indicates the number of pieces of division data that is equal to or greater than "2", the reception processor 80 counts the number "3" of the packets, the packets PKT-A, PKT-B, PKT-C, which are received by the receiver 70. The number of the received packets that is indicated by a numerical counting value that results from counting, is smaller than the number "6" of pieces of division data that is indicated by the number-of-pieces-of-division-data information Dn. For this reason, the reception processor 80 determines that, of the six pieces of division data that result from dividing the message MSG, three packets PKT that contain three pieces of division data DDT, respectively, are not received. In this manner, the numerical counting value that results from counting the number of the received packets PKT is compared with the number of pieces of division data that is indicated by the number-of-pieces-of-division-data information Dn which is contained in each packet PKT, and thus, even in a case where the message MSG is divided into various number of pieces of division data, the presence or absence of the division data DDT that is not received can be determined.

Next, the receiver 70 receives the packet PKT-F, and stores the division data DDT-F and various pieces of information, which are contained in the packet PKT-F, in the reception buffer 72. Because the final data information L that is contained in the packet PKT-F is "1", the reception processor 80 determines that the division data DDT-D which is contained in the packet PKT-D is the final division data of the message MSG. Furthermore, based on the reception of the packet PKT-F by the receiver 70, the reception processor 80 counts the number of the received packets PKT and sets the number of the received packets PKT to "4".

Because the number (="4") of the received packets PKT is smaller than the number "6" of pieces of division data, which is indicated by the number-of-pieces-of-division-data information Dn, the reception processor 80 determines that two packets PKT which include the pieces of division data DDT, respectively, that result from dividing the message MSG are not received. For this reason, the reception processor 80 causes the division data DDT-F that is contained in the received packet PKT-F, to be retained in the reception buffer 72, without being stored in the memory 30. That is, in a case where the division data DDT that is not received is present, the reception processor 80 suppresses the received final division data DDT-F from being stored in the memory 30 ((b) of FIG. 5).

In this manner, based on the final data information L and the number-of-pieces-of-division-data information Dn, the reception processor 80 suppresses the division data DDT corresponding to the message MSG from being stored in the memory 30. Therefore, even in a case where the order in which the plurality of packets PKT that are transferred via the plurality of paths NP is not guaranteed, the final division data DDT-F can be suppressed from being stored in the memory 30 earlier than any other division data DDT.

Next, in FIG. 6, the receiver 70 sequentially receives the packets PKT-D and PKT-E and stores the pieces of division data DDT-D and DDT-E, which are contained in the received packets PKT-D and PKT-E, respectively, and various pieces of information, which are contained in each of the received packets PKT-D and PKT-E, in the reception buffer 72. Based on the reception of the packets PKT-D and PKT-E by the receiver 70, the reception processor 80 counts the number of the received packets PKT and sets the number of the received packets PKT to "6".

Because the number "6" of the received packets PKT is the same as the number "6" of pieces of division data that is indicated by the number-of-pieces-of-division-data information Dn, the reception processor 80 determines that all the pieces of division data DDT that result from dividing the message MSG are received ((a) of FIG. 6). For this reason, first, the reception processor 80 sequentially stores the pieces of division data DDT-D and DDT-E that are contained in the packets PKT-D and PKT-E, respectively, in the memory 30 ((b) of FIG. 6). Next, the reception processor 80 stores the final division data DDT-F that is contained in the packet PKT-F, in the memory 30, and completes processing that receives the message MSG.

As described above, even in a case where the plurality of pieces of division data DDT are transferred via the plurality of paths NP and thus the order in which the pieces of division data DDT arrives is not guaranteed, the final division data DDT-F can be stored in the memory 30 later than any other division data DDT. Therefore, the final division data DDT-F is stored in the memory 30, and thus it can be guaranteed that the reception of all the pieces of division data DDT is completed. In other words, in a case where the plurality of packets PKT that contain the plurality of pieces of division data DDT, respectively, are transferred via the plurality of paths NP, it can be guaranteed that all the pieces of the division data DDT are received regardless of the order in which the final division data DDT-F is received.

For example, in a case where the processor 20 of the node ND2 monitors a storage area of the memory 30 in which the final division data DDT-F is stored, and detects that the division data DDT-F is retained in the memory 30, the processor 20 reads the message MSG from the memory 30. That is, the processor 20 detects that the final division data DDT-F is retained in the memory 30, and thus can acknowledge that the entire message MSG is received. Then, the processor 20 starts the data processing using the message MSG that is read.

For example, in a case where the reception processor 80 stores the division data DDT in the memory 30 in the order of the reception in the receiver 70, the final division data DDT-F is stored in the memory 30 before the pieces of division data DDT-D and DDT-E are stored in the memory 30. In this case, based on the final division data DDT-F being stored in the memory 30, the processor 20 reads erroneous data from a memory area in which the pieces of division data DDT-D and DDT-E are stored, and starts the data processing.

In other words, the final division data DDT-F is suppressed from being stored in the memory 30 until the reception of all the other pieces of division data DDT are completed, and thus the processor 20 can be suppressed from performing the data processing using the erroneous data. As a result, the information processing apparatus 10 and the information processing system 100 can be suppressed from malfunctioning.

Figure 7:
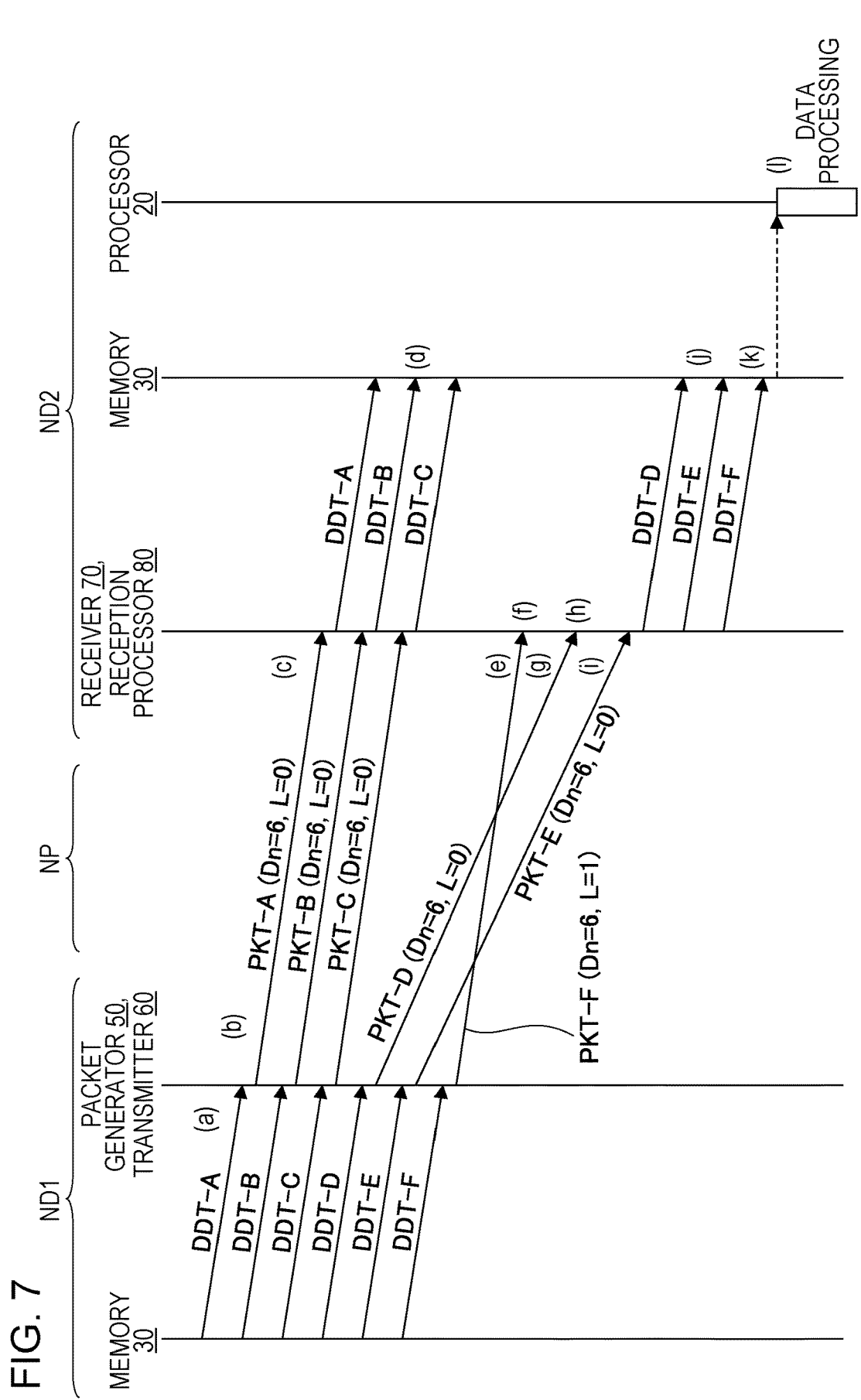
FIG. 7 is a diagram illustrating an example of operation of the information processing system that is illustrated in FIG. 1.

FIG. 7 illustrates an example of operation the information processing system 100 that is illustrated in FIG. 1. First, the packet generator 50 of the node ND1 sequentially generates six packets PKT which contain the pieces of division data DDT-A, DDT-B, DDT-C, DDT-D, DDT-E, and DDT-F, respectively, and each of which contains the number-of-pieces-of-division-data information Dn and the final data information L ((a) of FIG. 7). The packet PKT-F that contains the final division data DDT-F contains the final data information L (="1") and the other packets PKT-A, PKT-B, PKT-C, PKT-D, and PKT-E contain the final data information L (="0"). Furthermore, all the packets PKT-A, PKT-B, PKT-C, PKT-D, PKT-E, and PKT-F contain the number-of-pieces-of-division-data information Dn (="6"). The transmitter 60 sequentially transmits the packets PKT-A, PKT-B, PKT-C, PKT-D, PKT-E, and PKT-F toward the node ND2 via the plurality of paths NP ((b) of FIG. 7).

The receiver 70 of the node ND2 sequentially receives the packets PKT-A, PKT-B, and PKT-C that contain the final data information L (="0") ((c) of FIG. 7). Based on the final data information L (="0"), the reception processor 80 determines that the packets PKT-A, PKT-B, and PKT-C do not contain the final division data DDT-F. For this reason, the reception processor 80 sequentially stores the pieces of division data DDT-A, DDT-B, and DDT-C that are contained in the packets PKT-A, PKT-B, and PKT-C, respectively, in the memory 30 ((d) of FIG. 7).

Next, the receiver 70 receives the packet PKT-F that contains the final data information L (="1") ((e) of FIG. 7). The reception processor 80 determines that the packet PKT-F contains the final division data DDT-F, based on the final data information L (="1"), and determines that two packets PKT that are not received are present, based on the number-of-pieces-of-division-data information Dn (="6") that is included in the packet PKT-F. For this reason, the reception processor 80 suppresses the division data DDT-F, which is contained in the received packet PKT-F, from being stored in the memory 30 ((f) of FIG. 7).

Subsequently, the receiver 70 receives the packet PKT-D ((g) of FIG. 7). Because the packet PKT-D is received fifthly, that is, earlier than is indicated by the number-of-pieces-of-division-data information Dn (="6") that is contained in the packet PKT-D, the reception processor 80 suppresses the pieces of division data DDT-F and DDT-D, which are retained in the reception buffer 72, from being stored in the memory 30 ((h) of FIG. 7).

Next, the receiver 70 receives the packet PKT-E ((i) of FIG. 7). The packet PKT-E is received sixthly, that is, in the same order as indicated by the number-of-pieces-of-division-data information Dn (="6") that is contained in the packet PKT-E. For this reason, the reception processor 80 determines that all the pieces of division data DDT-A, DDT-B, DDT-C, DDT-D, DDT-E, and DDT-F that result from dividing the message MSG are received. Then, the reception processor 80 stores the division data DDT-D that is contained in the packet PKT-D, and the division data DDT-E that is contained in the packet PKT-E, in the memory 30 ((j) of FIG. 7). Next, the reception processor 80 sequentially stores the final division data DDT-F that is contained in the packet PKT-F, in the memory 30 ((k) of FIG. 7). Subsequently, the processor 20 detects that the final division data DDT-F is retained in the memory 30, and thus acknowledges that the entire message MSG is received. Then, the processor 20 performs computation using the pieces of division data DDT-A, DDT-B, DDT-C, DDT-D, DDT-E, and DDT-F, and thus starts the data processing ((l) of FIG. 7).

It is noted that the receiver 70 is assumed to receive the packets PKT-A, PKT-B, PKT-C, PKT-D, PKT-E, and PKT-F in the same order in which the transmitter 60 transmits the packets PKT-A, PKT-B, PKT-C, PKT-D, PKT-E, and PKT-F. In this case, the reception processor 80 sequentially stores the pieces of division data DDT-A, DDT-B, DDT-C, DDT-D, DDT-E, and DDT-F, which are contained in the packets PKT, respectively, in the memory 30. That is, in a case where the reception processor 80 receives the packet PKT-F that contains the final division data DDT-F, sixthly, that is, in the same order as indicated by the number-of-pieces-of-division-data information Dn (="6"), the reception processor 80 determines that the packet PKT that is not received is not present, and stores the final division data DDT-F in the memory 30.

Figure 8:
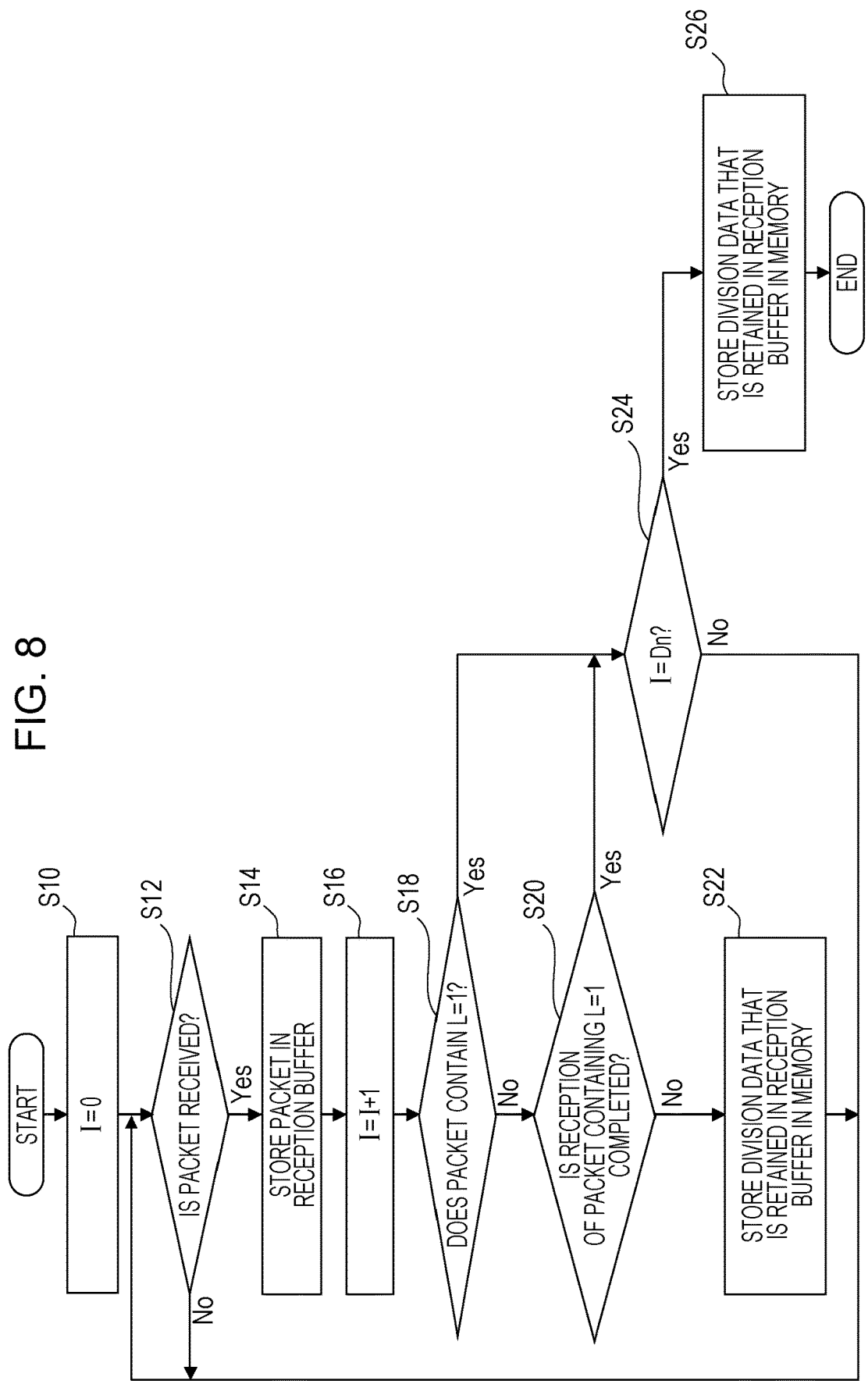
FIG. 8 is a diagram illustrating an example of a flow for receiving the packet in each node that is illustrated in FIG. 1.

FIG. 8 illustrates an example of a flow for receiving the packet PKT in each node ND that is illustrated in FIG. 1. The flow that is illustrated in FIG. 8 is executed on a per message MSG basis.

First, in Step S10, the reception processor 80 sets a variable I indicating the number of the received packets PKT to "0". The variable I may be retained as a numerical counting value that results from the counting by a counter, and may be retained by a register. Next, in Step S12, the receiver 70 waits until the packet PKT is received. In a case where the packet PKT is received, the receiver 70 causes the operation to proceed to Step S14.

In Step S14, the receiver 70 stores the received packet in the reception buffer 72. Next, in Step S16, the reception processor 80 increments the variable I by "1". Next, in Step S18, in a case where the final data information L that is contained in the received packet PKT is "1", the reception processor 80 causes the operation to proceed to Step S24. In a case where the final data information L that is contained in the received packet PKT is "0", the reception processor 80 causes the operation to proceed to Step S20.

In Step S20, in a case where the reception processor 80 completes the reception of the packet PKT that contains the final data information L which is "1", the reception processor 80 causes the operation to proceed to Step S24. In a case where the reception processor 80 does not receive the packet PKT that contains the final data information L which is "1", the reception processor 80 causes the operation to proceed to Step S22. That is, in a case where the reception of the final division data DDT is completed, the operation is caused to proceed to Step S24. In a case where the final division data DDT is not received, the operation is caused to proceed to Step S22.

In Step S22, the reception processor 80 stores the division data DDT that is retained in the reception buffer 72, in the memory 30, and causes the operation to return to Step S12. On the other hand, in Step S24, the reception processor 80 determines whether or not the variable I is equal to the number-of-pieces-of-division-data information Dn that is contained in the received packet PKT. In a case where the variable I is equal to the number-of-pieces-of-division-data information Dn that is contained in the received packet PKT, because all the pieces of division data DDT are received, the operation is caused to proceed to Step S26. In a case where the variable I is smaller than a number that is indicated by the number-of-pieces-of-division-data information Dn that is contained in the received packet PKT, because the division data DDT that is not received is present, the operation is caused to proceed to Step S12 in order to continue the operation of receiving the packet PKT. In Step S26, the reception processor 80 stores the division data DDT that is retained in the reception buffer 72, in the memory 30, and ends an operation of receiving the message MSG.

As described above, in the embodiment that is illustrated in FIGS. 1 to 8, even in a case where the order in which the plurality of packets PKT arrives is not guaranteed, it can be guaranteed that the reception of all the pieces of division data DDT is completed, by storing the final division data DDT in the memory 30. In other words, in a case where the plurality of packets PKT that contain the plurality of pieces of division data DDT, respectively, that result from dividing the message MSG are transferred via the plurality of paths NP, it can be guaranteed that all the pieces of the division data DDT are received regardless of the order in which the final division data DDT is received. That is, the processor 20 that processes the message MSG detects that the final division data DDT is retained in the memory 30, and thus can acknowledge that the entire message MSG is received.

The final division data DDT is suppressed from being stored in the memory 30 until the reception of all the other pieces of division data DDT are completed, and thus the processor 20 can be suppressed from performing the data processing using the erroneous data. As a result, the information processing apparatus 10 and the information processing system 100 can be suppressed from malfunctioning.

Figure 9:
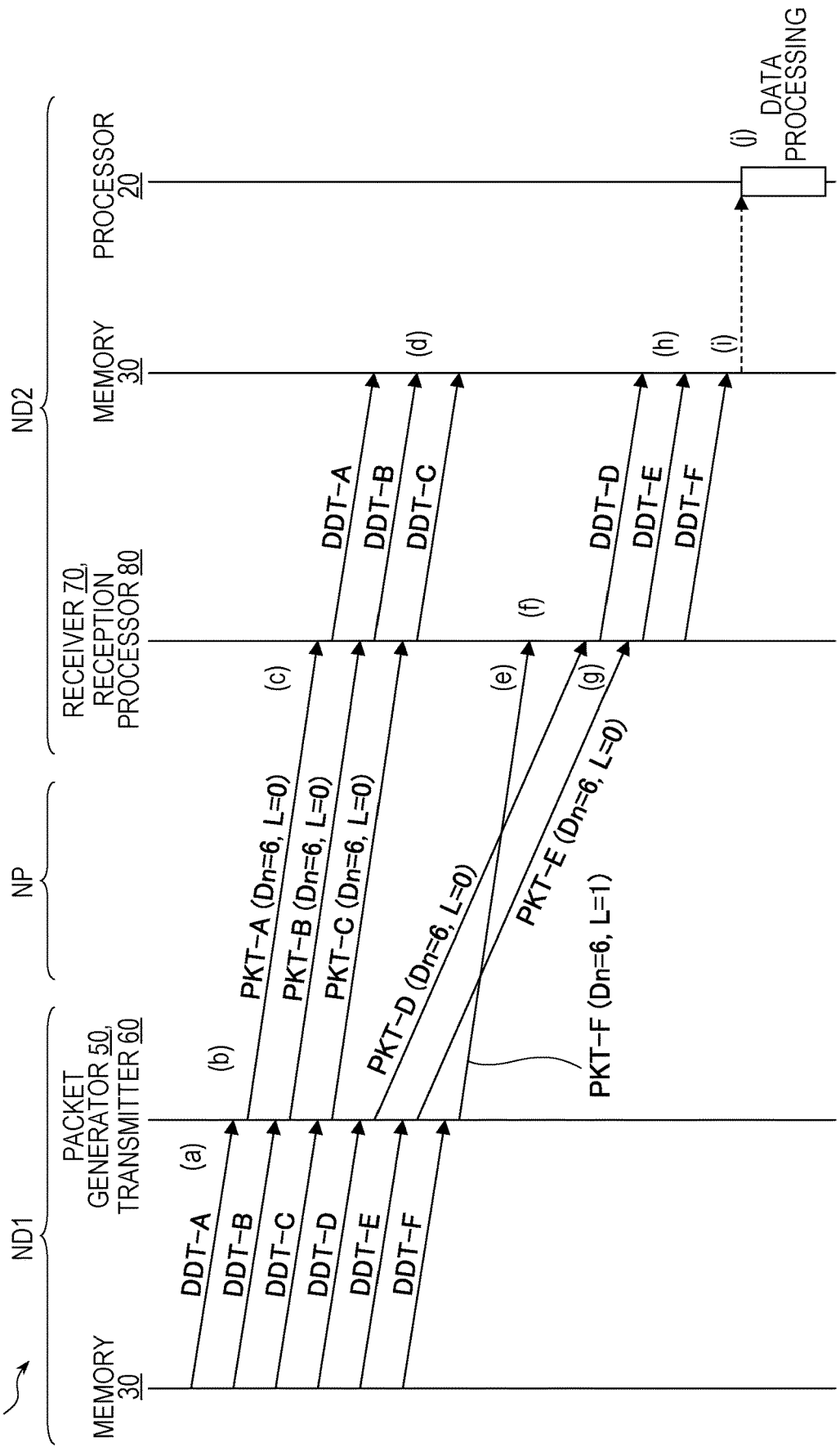
FIG. 9 is a diagram illustrating an example of operation of an information processing system according to another embodiment.

FIG. 9 illustrates an example of operation of an information processing system according to another embodiment. That is, FIG. 9 illustrates an example of a method of controlling the information processing system. A detailed description of the same or similar operation as the operation that is illustrated in FIG. 7 is omitted. A configuration of an information processing system 100A that realizes the operation that is illustrated in FIG. 9 is the same as the configuration of the information processing system 100 that is illustrated in FIG. 1.

That is, the information processing system 100A has a plurality of information processing apparatuses 10 (nodes ND) that are connected to each other via the plurality of paths NP, and each information processing apparatus 10 has the processor 20, the memory 30, and the network interface 40. The network interface 40 has the packet generator 50, the transmitter 60, the receiver 70, and the reception processor 80. Operation of the information processing system 100A is the same as the operation of the information processing system 100 that is illustrated in FIG. 7, except that a portion of the operation of the reception processor 80 is different from that in FIG. 7. For example, the information processing system 100A, as in FIG. 2, has the plurality of nodes ND that are connected to each other by the mesh-type two-dimensional network, and operates as the parallel computer.

Operations in (a) of FIG. 9 to (g) of FIG. 9 are the same as those in (a) of FIG. 7 to (g) of FIG. 7, respectively. The receiver 70 sequentially receives the packets PKT-D and PKT-E ((g) of FIG. 7). In a case where the final division data DDT is received earlier than any other division data DDT, each time the receiver 70 receives the division data DDT, the reception processor 80 stores the received division data DDT in the memory 30 ((h) of FIG. 9).

The packet PKT-E is received sixthly, that is, in the same order as indicated by the number-of-pieces-of-division-data information Dn (="6") that is contained in the packet PKT-E. For this reason, the reception processor 80 determines that all the pieces of division data DDT-A, DDT-B, DDT-C, DDT-D, DDT-E, and DDT-F that result from dividing the message MSG are received. Then, the reception processor 80 stores the final division data DDT-F that is contained in the packet PKT-F, in the memory 30 ((i) of FIG. 9). Subsequently, the processor 20 starts the data processing using the pieces of division data DDT-A, DDT-B, DDT-C, DDT-D, DDT-E, and DDT-F ((j) of FIG. 9).

In the operation that is illustrated in FIG. 9, after the final division data DDT is received, each time the packet PKT is received, the division data DDT that is contained in the received packet PKT is stored in the memory 30. Accordingly, the storing of the division data DDT in the memory 30 is completed earlier than in a case where, after all the pieces of division data DDT are received, the received pieces of division data DDT (including the final division data DDT) are stored in the memory 30. As a result, the processor 20 can start the data processing earlier than in FIG. 7. Thus, processing performance of the information processing system 100A can be improved more than processing performance of the information processing system 100.

Figure 10:
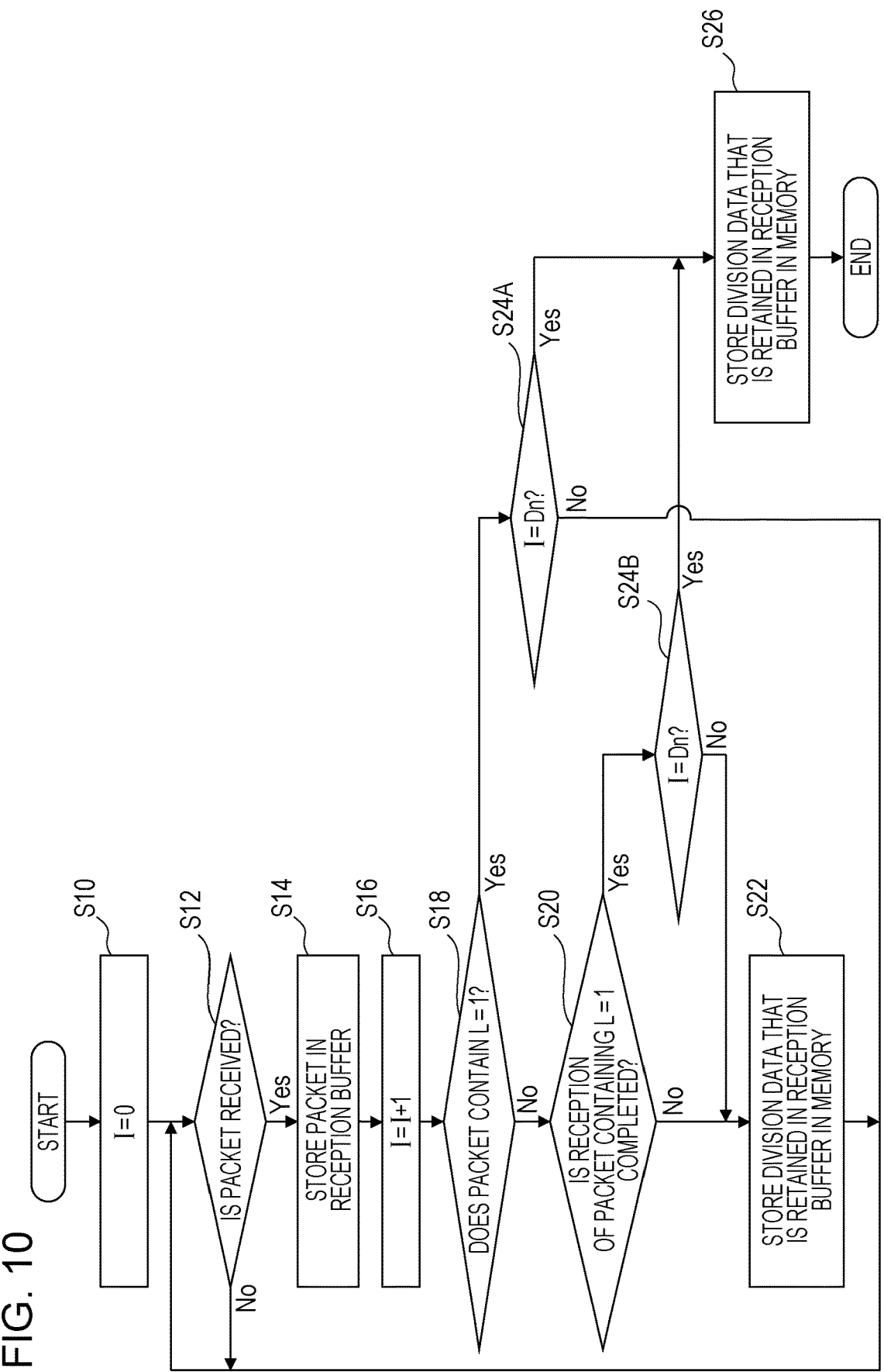
FIG. 10 is a diagram illustrating an example of the flow for receiving the packet in a node that is illustrated in FIG. 9.

FIG. 10 illustrates an example of a flow for receiving the packet in the node ND2 that is illustrated in FIG. 9. The same operation as the operation that is illustrated in FIG. 8 is given the same step number, and a detailed description thereof is omitted. The flow that is illustrated in FIG. 10 is the same as the flow that is illustrated in FIG. 8, except that instead of Step S24 in FIG. 8, Steps S24A and S24B are provided.

In Step S18, in a case where the final data information L that is contained in the received packet PKT is "1", the reception processor 80 causes the operation to proceed to Step S24A. In a case where the final data information L that is contained in the received packet PKT is "0", the reception processor 80 causes the operation to proceed to Step S20. In Step S20, in the case where the reception processor 80 completes the reception of the packet PKT that contains the final data information L which is "1", the reception processor 80 causes the operation to proceed to Step S24B. In the case where the reception processor 80 does not receive the packet PKT that contains the final data information L which is "1", the reception processor 80 causes the operation to proceed to Step S22.

In Step S24A, in a case where the variable I is equal to the number-of-pieces-of-division-data information Dn that is contained in the received packet PKT, because all the pieces of division data DDT are received, the reception processor 80 causes the operation to proceed to Step S26. On the other hand, in a case where the variable I is smaller than the number that is indicated by the number-of-pieces-of-division-data information Dn that is contained in the received packet PKT, because the division data DDT that is not received is present, the reception processor 80 causes the operation to return to Step S12.

In Step S24B, in the case where the variable I is equal to the number-of-pieces-of-division-data information Dn that is contained in the received packet PKT, because all the pieces of division data DDT are received, the reception processor 80 causes the operation to proceed to Step S26. On the other hand, in the case where the variable I is smaller than the number that is indicated by the number-of-pieces-of-division-data information Dn that is contained in the received packet PKT, because the division data DDT that is not received is present, the reception processor 80 causes the operation to proceed to Step S22.

In Step S22, the reception processor 80 stores the division data DDT that is retained in the reception buffer 72, in the memory 30. An operation in Step S26 is the same as the operation in Step S26 that is illustrated in FIG. 8. That is, in FIG. 10, after the final division data DDT is received, each time the packet PKT is received, the division data DDT that is contained in the packet PKT is stored in the memory 30.

As described above, effects of embodiments that are described in FIGS. 9 and 10, which are the same as the effects of the embodiments in FIGS. 1 to 8, can be achieved. For example, in a case where the plurality of packets PKT that contain the plurality of pieces of division data DDT, respectively, that result from dividing the message MSG are transferred via the plurality of paths NP, it can be guaranteed that all the pieces of the division data DDT are received regardless of the order in which the final division data DDT is received. Furthermore, the processor 20 can be suppressed from performing the data processing using the erroneous data, and the information processing apparatus 10 and the information processing system 100A can be suppressed from malfunctioning.

In addition, in the embodiments that are illustrated in FIGS. 9 and 10, the storing of the division data DDT in the memory 30 is completed earlier than in the case where, after all the pieces of division data DDT are received, the received pieces of division data DDT are stored in the memory 30. As a result, the processor 20 can start the data processing earlier than in FIG. 7. Thus, processing performance of the information processing system 100A can be improved more than processing performance of the information processing system 100.

FIG. 11 illustrates a method of controlling an information processing apparatus, an information processing system, and a method of controlling the information processing system, according to another embodiment. The same or similar constituent element as in FIG. 1 is given the same reference numeral, and a detailed description thereof is omitted. An information processing system 100B that is illustrated in FIG. 11 has a packet generator 50B and a reception processor 80B instead of the packet generator 50 and the reception processor 80 of the information processing system 100 that is illustrated in FIG. 1. The other configurations of the information processing system 100B are the same as those of the information processing system 100 that is illustrated in FIG. 1. As in FIG. 2, the information processing system 100B has, for example, the plurality of nodes ND that are connected to each other by the mesh-type two-dimensional network, and operates as the parallel computer.

In addition to the function of the packet generator 50 that is illustrated in FIG. 1, the packet generator 50B has a function of adding data identification information MID identifying a plurality of messages MSG to the packet PKT. In addition to the function of the reception processor 80 that is illustrated in FIG. 1, the reception processor 80B has a function of identifying the message MSG based on the data identification information MID and controlling storing of each of the identified messages MSG in the memory 30.

Figure 12:
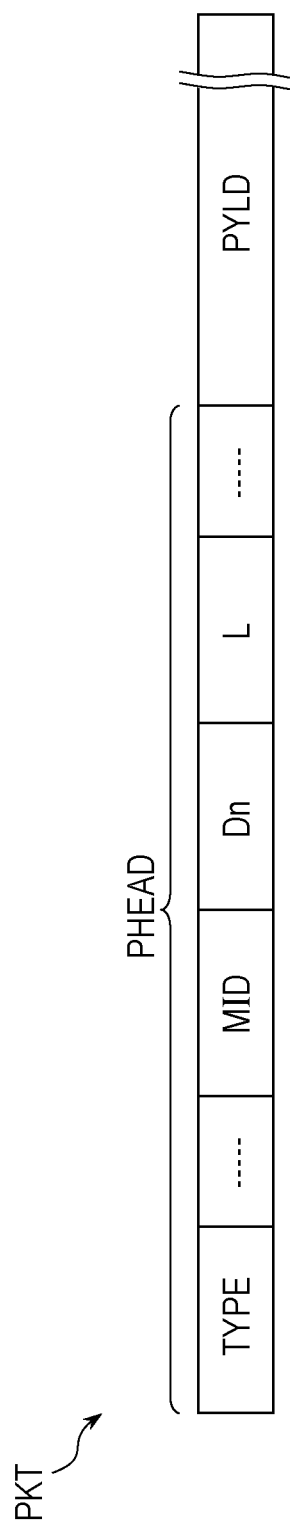
FIG. 12 is a diagram illustrating an example of a format of a packet that is used in the information processing system which is illustrated in FIG. 11.

FIG. 12 illustrates an example of a format of the packet PKT that is used in the information processing system 100B that is illustrated in FIG. 11. A detailed description of the same constituent element as in FIG. 3 is omitted. The format of the packet PKT that is illustrated in FIG. 12 is the same as the format of the packet PKT that is illustrated in FIG. 3, except that an area in which the data identification information MID is stored is added.

Figure 13:
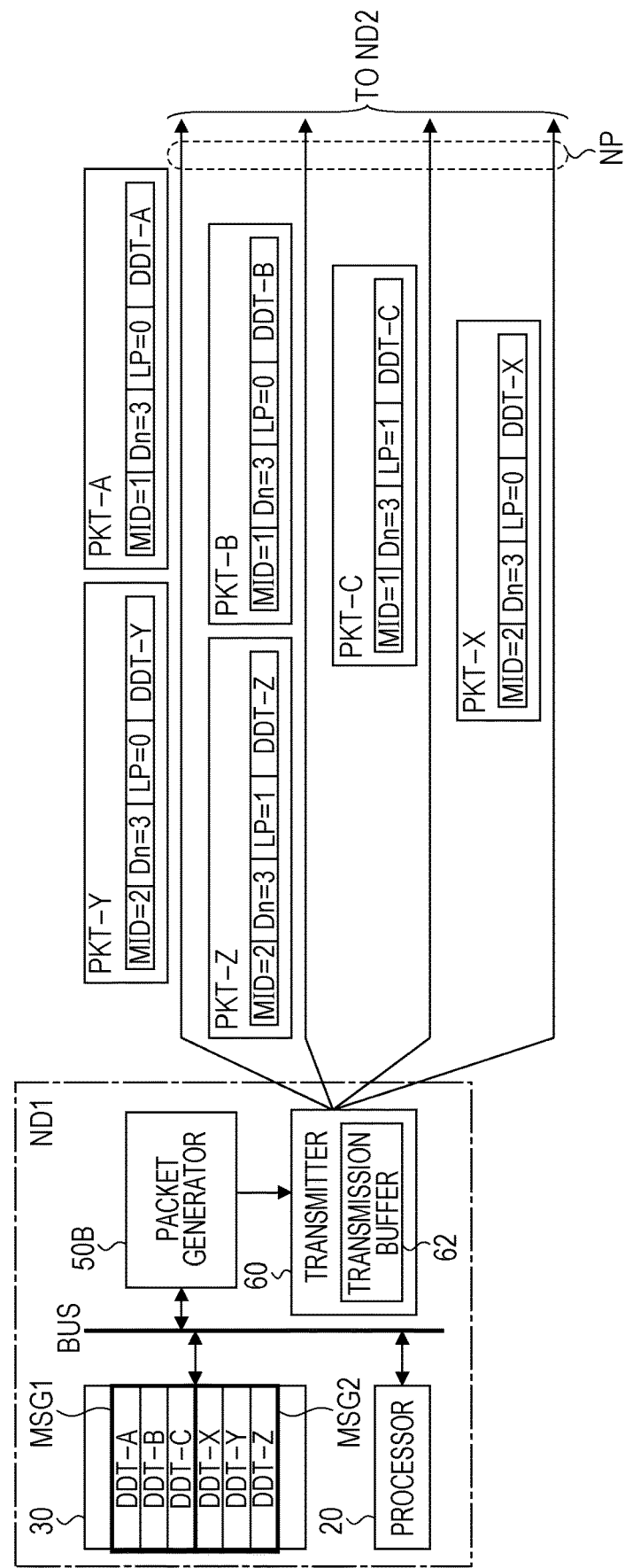
FIG. 13 is a diagram illustrating an example of an operation of transmitting the packet in the information processing system that is illustrated in FIG. 11.

FIG. 13 illustrates an example of an operation of transmitting the packet PKT in the information processing system 100B that is illustrated in FIG. 11. A detailed description of the same or similar operation as illustrated in FIG. 4 is omitted. In an example that is illustrated in FIG. 13, each of two messages, messages MSG1 and MSG2, is divided into three pieces of division data DDT (DDT-A, DDT-B, and DDT-C, and DDT-X, DDT-X, DDT-Y, and DDT-Z), and the six pieces of division data DDT are transferred from the node ND1 to the node ND2.

First, the packet generator 50B of the node ND1 reads the pieces of division data DDT-A, DDT-B, and DDT-C and the pieces of division data DDT-X, DDT-Y, and DDT-Z, from the memory 30. Each of the pieces of division data DDT-C and DDT-Z is the final division data.

The packet generator 50B generates the packets PKT-A, PKT-B, and PKT-C that contain the pieces of division data DDT-A, DDT-B, and DDT-C, respectively. The packet generator 50B adds the data identification information MID (="1") indicating the message MSG1, the number-of-pieces-of-division-data information Dn (="3"), and the final data information L (="0") to the packets PKT-A and PKT-B. The packet generator 50B adds the data identification information MID (="1") indicating the message MSG1, the number-of-pieces-of-division-data information Dn (="3"), and the final data information L (="1") to the packet PKT-C.

Furthermore, the packet generator 50B generates the packets PKT-X, PKT-Y, and PKT-Z that contain the pieces of division data DDT-X, DDT-Y, and DDT-Z, respectively. The packet generator 50B adds the data identification information MID (="2") indicating the message MSG2, the number-of-pieces-of-division-data information Dn (="3"), and the final data information L (="0") to the packets PKT-X and PKT-Y. The packet generator 50B adds the data identification information MID (="2") indicating the message MSG2, the number-of-pieces-of-division-data information Dn (="3"), and the final data information L (="1") to the packet PKT-Z.

The packet generator 50B sequentially stores the generated packet PKT in the transmission buffer 62 of the transmitter 60. Subsequently, as in FIG. 4, the transmitter 60 sequentially transmits the packets PKT-A, PKT-B, PKT-C, PKT-X, PKT-Y, and PKT-Z, which are stored in the transmission buffer 62, toward the node ND2 via the plurality of paths NP.

Figure 14:
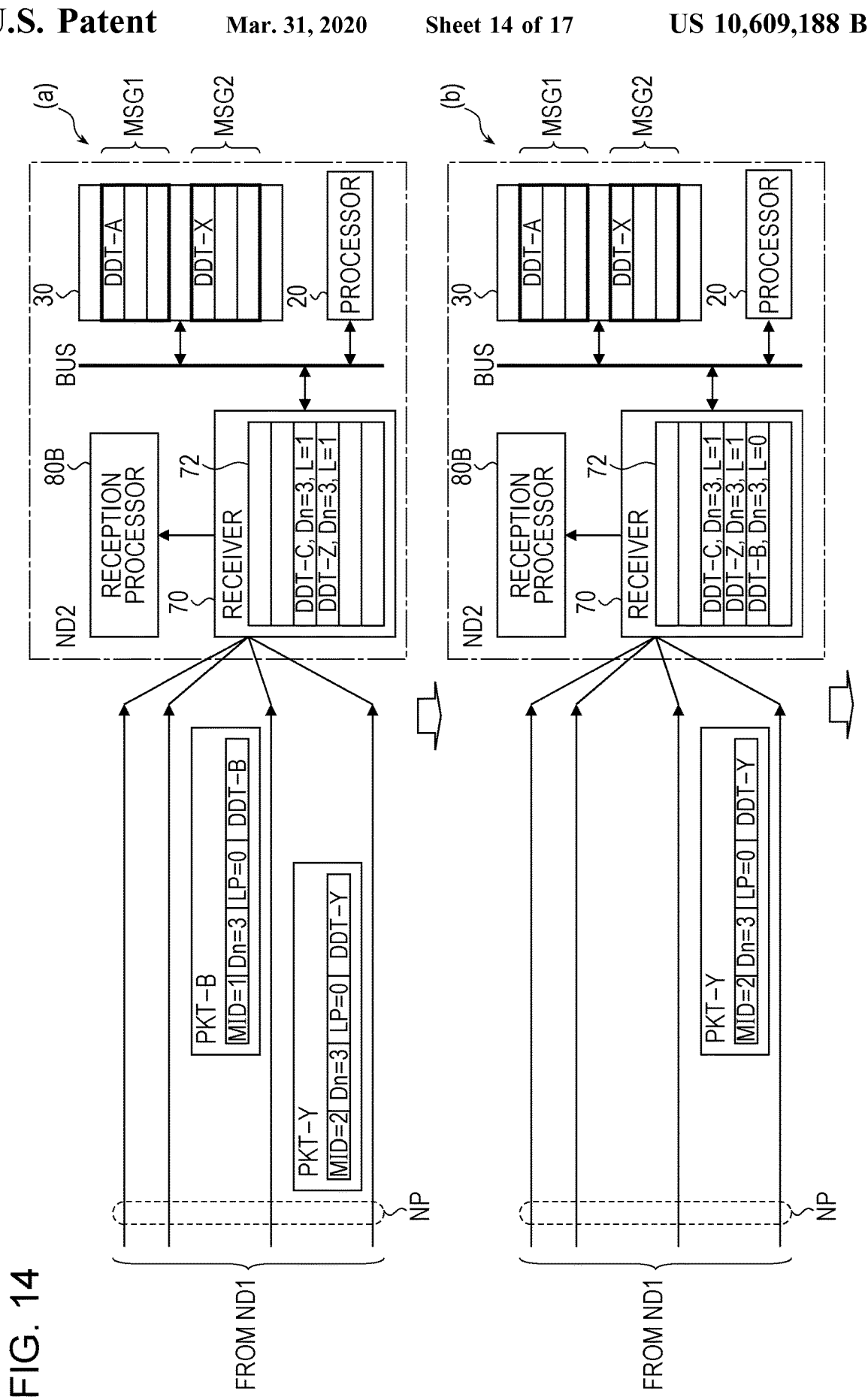
FIG. 14 is a diagram illustrating an example of an operation of receiving the packet in the information processing system that is illustrated in FIG. 11.
Figure 15:
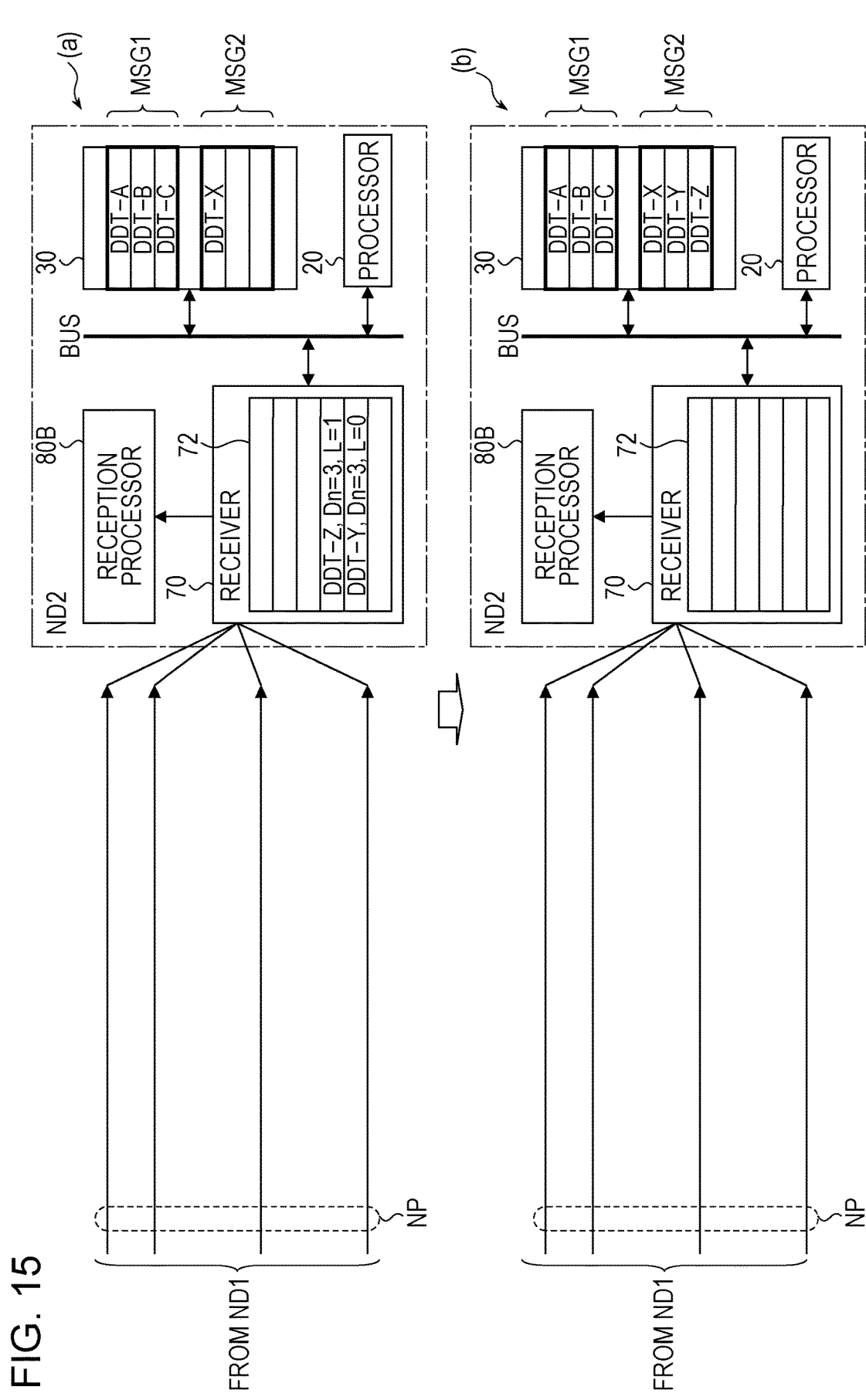
FIG. 15 is a diagram illustrating a continuation of the operation of receiving the packet that is illustrated in FIG. 14.

FIGS. 14 and 15 illustrate an example of an operation of receiving the packet PKT in the information processing system 100 B that is received in FIG. 11. A detailed description of the same or similar operation as illustrated in FIGS. 5 and 6 is omitted. First, the receiver 70 of the node ND2 sequentially receives the packets PKT-A, PKT-X, PKT-C, and PKT-Z. The receiver 70 stores the pieces of division data DDT-A, DDT-X, DDT-C and DDT-Z, which are contained in the received packets PKT-A, PKT-X, PKT-C, and PKT-Z, respectively, and various pieces of information, which are contained in each of the received packets PKT-A, PKT-X, PKT-C, and PKT-Z, in the reception buffer 72 (not illustrated).

Based on the data identification information MID that is contained in each packet PKT, the reception processor 80B detects that the pieces of division data DDT-A and DDT-C, and the pieces of division data DDT-X and DDT-Z correspond to different messages, the messages MSG1 and MSG2, respectively. Because the final data information L that is contained in the packets PKT-A and PKT-X is "0", the reception processor 80B stores the pieces of division data DDT-A and DDT-X in the memory 30.

Furthermore, the reception processor 80B counts the number of the packets PKT of each of the messages MSG1 and MSG2, which are received by the receiver 70. The number (="2") of the received packets of each of the messages MSG1 and MSG2 is smaller than the number (="3") of pieces of division data that is indicated by the number-of-pieces-of-division-data information Dn that is included in the corresponding packet PKT. Because of this, the reception processor 80B determines that the packet PKT which is not received is present. The packet PKT that is not received is present and the final data information L that is contained in the packets PKT-C and PKT-Z is "1". Because of this, the reception processor 80B suppresses the pieces of division data DDT-C and DDT-Z from being stored in the memory 30 ((a) of FIG. 14).

Next, the receiver 70 receives the packet PKT-B, and stores the division data DDT-B and various pieces of information that are contained in the packet PKT-B, in the reception buffer 72. The reception processor 80B detects that the number (="3") of the received packets PKT that contains the data identification information MID which is "1" is the same as the number (="3") of pieces of division data that is indicated by the number-of-pieces-of-division-data information Dn which is contained in the packet PKT-B that contains the data identification information MID which is "1". For this reason, the reception processor 80B determines that all the pieces of division data DDT that correspond to the message MSG1 are received ((b) of FIG. 14).

Next, in FIG. 15, the reception processor 80B sequentially stores the pieces of division data DDT-B and DDT-C that are retained in the reception buffer 72, in the memory 30. In a case where it is detected that the division data DDT-C is retained in the memory 30, the processor 20 reads the message MSG1 from the memory 30, and starts the data processing using the message MSG1 that is read.

Furthermore, the receiver 70 receives the packet PKT-Y, and stores the division data DDT-Y and various pieces of information that are contained in the packet PKT-Y, in the reception buffer 72. The reception processor 80B detects that the number (="3") of the received packets PKT that contains the data identification information MID which is "2" is the same as the number (="3") of pieces of division data that is indicated by the number-of-pieces-of-division-data information Dn which is contained in the packet PKT-Y that contains the data identification information MID which is "2". For this reason, the reception processor 80B determines that all the pieces of division data DDT that correspond to the message MSG2 are received ((a) of FIG. 15).

Next, the reception processor 80B sequentially stores the pieces of division data DDT-Y and DDT-Z that are retained in the reception buffer 72, in the memory 30. In a case where it is detected that the division data DDT-Z is retained in the memory 30, the processor 20 reads the message MSG2 from the memory 30, and starts the data processing using the message MSG2 that is read ((b) of FIG. 15). In this manner, the processor 20 detects that the final division data DDT of each message MSG is retained in the memory 30, and thus can acknowledge that each message MSG is received in its entirety.

As illustrated in FIGS. 14 and 15, the data identification information MID that identifies the message MSG is added to the packet PKT, and thus, the reception processor 80B can perform processing that stores the division data DDT in the memory 30, for each message MSG. Accordingly, even in a case where the pieces of division data DDT of the plurality of messages MSG are mixed and the mixed pieces of division data DDT are transmitted from the node ND1 to the node ND2, it can be guaranteed that all the pieces of division data DDT are received for each message MSG.

Figure 16:
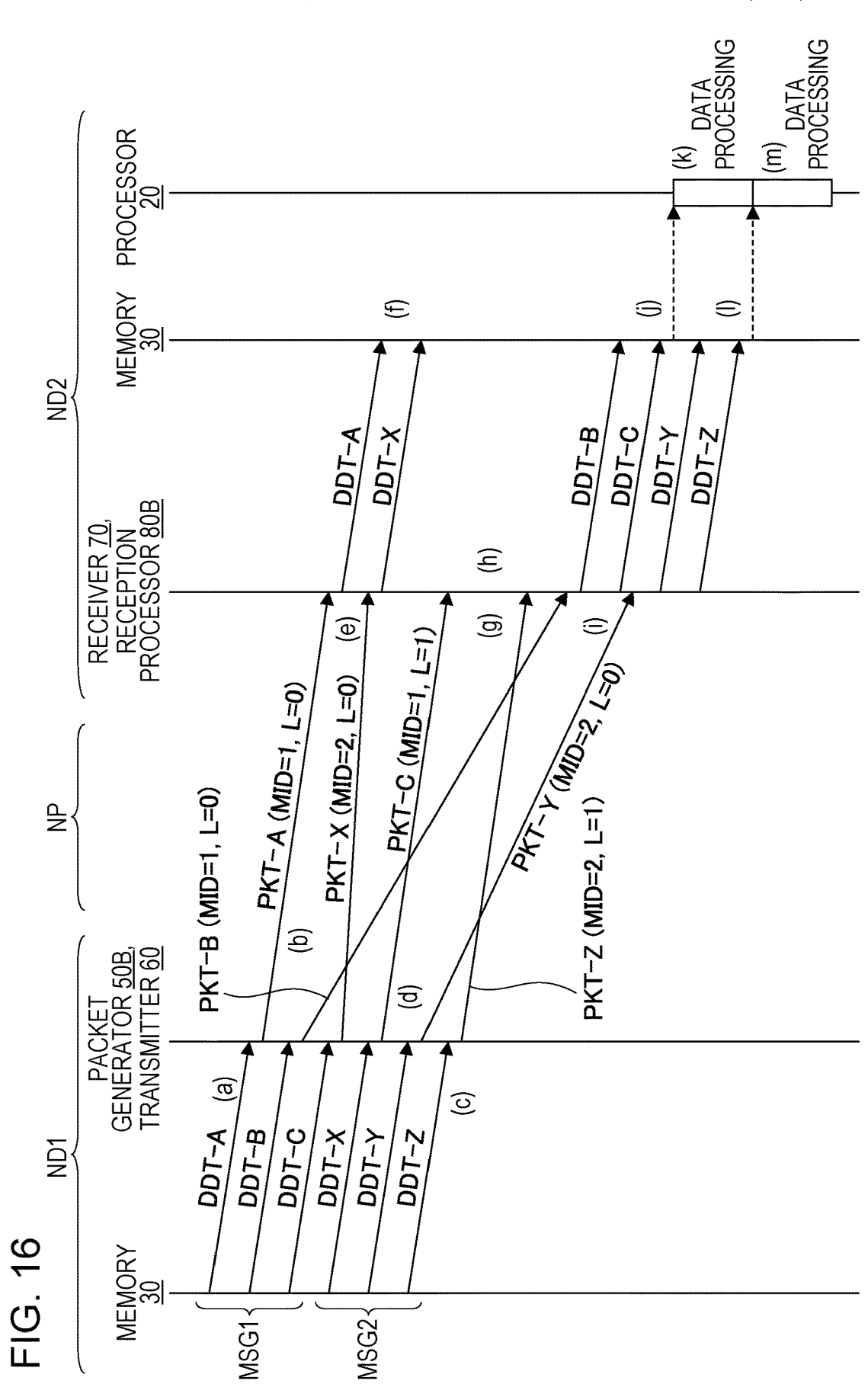
FIG. 16 is a diagram illustrating an example of operation of the information processing system that is illustrated in FIG. 11.

FIG. 16 illustrates an example of operation of the information processing system 100B that is illustrated in FIG. 11. A detailed description of the same or similar operation as illustrated in FIG. 7 is omitted.

First, the packet generator 50B of the node ND1 reads the pieces of division data DDT-A, DDT-B, and DDT-C that correspond to the message MSG1, from the memory 30, generates the packets PKT-A, PKT-B, and PKT-C, and stores the generated packets PKT-A, PKT-B, and PKT-C in the transmitter 60 ((a) of FIG. 16). The transmitter 60 of the node ND1 sequentially transmits the packets PKT-A, PKT-B, and PKT-C, which are generated by the packet generator 50B, toward the node ND2 via the plurality of paths NP ((b) of FIG. 16).

Furthermore, the packet generator 50B of the node ND1 reads the pieces of division data DDT-X, DDT-Y, and DDT-Z that correspond to the message MSG2, from the memory 30, generates the packets PKT-X, PKT-Y, and PKT-Z, and stored the generated packets PKT-X, PKT-Y, and PKT-Z in the transmitter 60 ((c) of FIG. 16). The transmitter 60 of the node ND1 sequentially transmits the packets PKT-X, PKT-Y, and PKT-Z, which are generated by the packet generator 50B, toward the node ND2 via the plurality of paths NP ((d) of FIG. 16). It is noted that the data identification information MID, the number-of-pieces-of-division-data information Dn, and the final data information L, which are contained in each packet PKT, are the same as the pieces of information that are contained in the packet PKT which is illustrated in FIG. 13.

The receiver 70 of the node ND2 sequentially receives the packets PKT-A, and PKT-X that contain the final data information L (="0") ((e) of FIG. 16). The final data information L that is contained in the packets PKT-A and PKT-X is "0". Because of this, the reception processor 80B stores the pieces of division data DDT-A and DDT-X, which are received by the receiver 70, in the memory 30 ((f) of FIG. 16).

Next, the receiver 70 sequentially receives the packets PKT-C, and PKT-Z that contain the final data information L (="1") ((g) of FIG. 16). Based on the final data information L (="1"), the reception processor 80B determines that the packets PKT-C and PKT-Z contain the pieces of final division data DDT-C and DDT-Z, respectively. Furthermore, based on the number-of-pieces-of-division-data information Dn (="3"), the reception processor 80B determines that the packet PKT that is not received is present in each of the messages MSG1 and MSG2. For this reason, the reception processor 80B suppresses the pieces of division data DDT-C and DDT-Z from being stored in the memory 30 ((h) of FIG. 16).

Subsequently, the receiver 70 sequentially receives the packets PKT-B and PKT-Y ((i) of FIG. 16). Based on the data identification information MID and the number-of-pieces-of-division-data information Dn, which are contained in the packet PKT-B, the reception processor 80B determines that all the pieces of division data DDT which correspond to the message MSG1 are received. Then, the reception processor 80B sequentially stores the pieces of division data DDT-B and DDT-C, which are retained in the reception buffer 72 of the receiver 70, in the memory 30 ((j) of FIG. 16). The processor 20 that detects that the final division data DDT-C is retained in the memory 30 starts the data processing using the pieces of division data DDT-A, DDT-B, and DDT-C ((k) of FIG. 16).

Furthermore, based on the data identification information MID and the number-of-pieces-of-division-data information Dn, which are contained in the packet PKT-Y, the reception processor 80B determines that all the pieces of division data DDT which correspond to the message MSG2 are received. Then, the reception processor 80B sequentially stores the pieces of division data DDT-Y and DDT-Z, which are retained in the reception buffer 72 of the receiver 70, in the memory 30 ((l) of FIG. 16). The processor 20 that detects that the final division data DDT-Z is retained in the memory 30 starts the data processing using the pieces of division data DDT-X, DDT-Y, and DDT-Z ((m) of FIG. 16).

Figure 17:
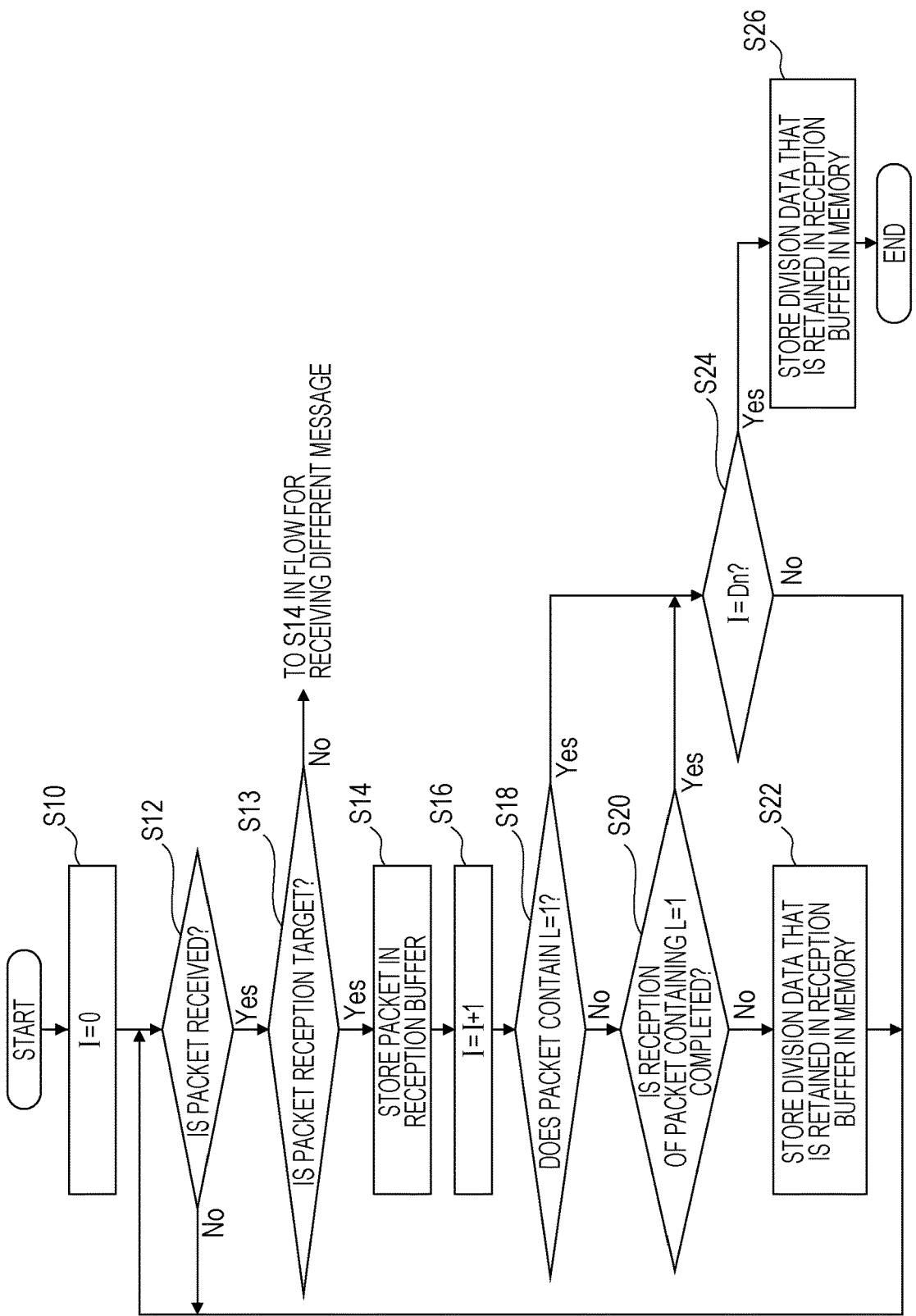
FIG. 17 is a diagram illustrating an example of a flow for receiving the packet in each node that is illustrated in FIG. 11.

FIG. 17 illustrates an example of a flow for receiving the packet PKT in each node ND that is illustrated in FIG. 11. The same operation as the operation that is illustrated in FIG. 8 is given the same step number, and a detailed description thereof is omitted. The flow that is illustrated in FIG. 17 is the same flow that is illustrated in FIG. 8, except that Step S13 is added between Step S12 and Step S14 in FIG. 8.

In Step S13, based on the data identification information MID that is contained in the packet PKT which is received by the receiver 70, the reception processor 80B determines whether or not the received packet PKT is a reception-target packet PKT. In a case where the received packet PKT is the reception-target packet PKT, the operation proceeds to Step S14. That is, in a case where the data identification information MID is the same as the data identification information MID that contained in the already-received packet PKT, or in a case where the packet PKT that contains the data identification information MID is first received, the operation proceeds to Step S14.

On the other hand, in a case where the received packet PKT is not the reception-target packet PKT, that is, in a case where the data identification information MID is different from the data identification information MID that is contained in the already-received packet PKT, the operation proceeds to Step S14 in the flow for receiving another message MSG. The flow for receiving another message MSG is the same as in FIG. 17. That is, the reception processor 80B possibly performs reception processing on the plurality of messages MSG in a concurrent manner.

It is noted that, as illustrated in FIGS. 9 and 10, after receiving the final division data DDT, the reception processor 80B may store the division data DDT, which is contained in the received packet PKT, in the memory 30, whenever receiving the packet PKT. In this case, as in FIG. 10, instead of Step S24, Steps S24A and S24B are added in the reception flow that is illustrated in FIG. 17. In a case where, after the final division data DDT is received, two or more pieces of division data DDT that are not received are present for each message MSG, the processor 20 can start the data processing earlier than in a case where pieces of division data DDT are stored together in the memory 30.

As described above, effects of embodiments that are described in FIGS. 11 to 17, which are the same as the effects of the embodiments in FIGS. 1 to 8, can also be achieved. For example, in a case where the plurality of packets PKT that contain the plurality of pieces of division data DDT, respectively, that result from dividing the message MSG are transferred via the plurality of paths NP, it can be guaranteed that all the pieces of the division data DDT are received regardless of the order in which the final division data DDT is received. Furthermore, the processor 20 can be suppressed from performing the data processing using the erroneous data, and the information processing apparatus 10 and the information processing system 100B can be suppressed from malfunctioning.

In addition, in the embodiments that are described with reference to FIGS. 11 to 17, the data identification information MID that identifies the message MSG is added to the packet PKT, and thus, for each message MSG, the reception processor 80B can perform the processing that stores the division data DDT in the memory 30. Accordingly, even in the case where the pieces of division data DDT of the plurality of messages MSG are mixed and the mixed pieces of division data DDT are transmitted from the node ND1 to the node ND2, for each message MSG, it can be guaranteed that all the pieces of division data DDT are received.

Therefore, the processor 20 detects that the final division data DDT is retained in the memory 30, each message MSG, and thus can acknowledge that each message MSG is received in its entirety.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a receiver configured to receive a plurality of data packets, the plurality of data packets generated by dividing a message into a plurality of division data and storing, for each of the plurality of division data, one of the plurality of division data into one of the plurality of data packets, wherein each of the plurality of data packets also includes a data value indicating a quantity of the plurality of division data and data indicating whether or not the data packet includes final division data corresponding to an end of the message;
    a memory; and
    a processor coupled to the memory, the processor configured to:
        store the division data that is contained in a packet of the plurality of data packets that are received by the receiver, in the memory, and
        suppress the final division data from being stored in the memory until the quantity of the plurality of data packets received by the receiver equates to the data value indicating the quantity of the plurality of division data, in a case where the final division data is received earlier than any one of the other plurality of division data.

2. The information processing apparatus according to claim 1,
    wherein, in the case where the final division data is received earlier than any one of the other plurality of division data, the processor is configured to
        wait until the receiver receives the quantity of the plurality of division data that equates to the data value indicating the quantity of the plurality of division data,
        store the plurality of division data received by the receiver after the final division data is received in the memory, and
        store, subsequently, the final division data in the memory.

3. The information processing apparatus according to claim 1,
    wherein, in the case where the final division data is received earlier than any of the other plurality of division data, each time the receiver receives division data, the processor is configured to
        store received division data in the memory, and
        after storing division data resulting from excluding the final division data from all pieces of division data in the memory, store the final division data in the memory.

4. The information processing apparatus according to claim 1,
    wherein the processor is configured to
        count the number of the received plurality of division data, and
        in a case where a numerical counting value that results from counting is smaller than the data value indicating the quantity of the plurality of division data, detect that division data which is not received is present.

5. The information processing apparatus according to claim 1,
    wherein the at least one processor is configured to
        identify the message based on data identification information that is contained in the packet, and
        control storing in the memory each of the plurality of division data corresponding to the identified message.

6. The information processing apparatus according to claim 1,
    wherein the processor is configured to store the division data that is contained in the packet, in a memory area of the memory, which is indicated by an address that is contained in the packet, and
    wherein different addresses, respectively, are allocated to the memory area of the memory in which the plurality of division data, respectively, are to be stored.

7. An information processing system comprising:
    a first information processing apparatus including
        a packet generator that generates a plurality of data packets each of which includes one of a plurality of division data obtained by dividing a message, wherein each of the plurality of data packets also includes a data value indicating a quantity of the plurality of division data and data indicating whether or not the data packet includes final division data corresponding to an end of the message, and
        a transmitter that transmits the plurality of data packets to a transmission destination; and
    a second information processing apparatus including
        a receiver that receives the plurality of data packets,
        a memory, and
        a processor coupled to the memory, the processor configured to
            store division data which is contained in a packet of the plurality of data packets in the memory, and
            suppress the final division data from being stored in the memory until the quantity of the plurality of data packets received by the receiver equates to the data value indicating the quantity of the plurality of division data, in a case where the final division data is received earlier than any one of the other plurality of division data.

8. A method of controlling an information processing system, the method comprising:
    generating, by a first information processing apparatus, a plurality of data packets each of which includes one of a plurality of division data obtained by dividing a message, wherein each of the plurality of data packets also includes a data value indicating a quantity of the plurality of division data and data indicating whether or not the data packet includes final division data corresponding to an end of the message;
    transmitting, by the first information processing apparatus, the plurality of data packets to a transmission destination;

receiving, by a second information processing apparatus, the plurality of data packets;

storing, by the second information processing apparatus, a packet of the plurality of data packets in memory; and suppressing, by the second information processing apparatus, the final division data from being stored in memory until the quantity of the plurality of data packets received by the receiver equates to the data value indicating the quantity of the plurality of division data, in a case where the final division data is received earlier than any one of the other plurality of division data.

* * * * *